(12) United States Patent
Baker et al.

(10) Patent No.: US 7,768,958 B1
(45) Date of Patent: *Aug. 3, 2010

(54) FLEXIBLE ARCHITECTURE FOR WIRELESS COMMUNICATION NETWORKS

(75) Inventors: John Baker, Southlake, TX (US); David Hui, Fremont, CA (US); Martin Greenwood, Grapevine, TX (US); Yong Zhou, San Jose, CA (US); Prasanna Satarasinghe, McKinney, TX (US); Antti Linden, Colleyville, TX (US)

(73) Assignee: Intel Corporation, Santa Clara, CA (US)

( * ) Notice: Subject to any disclaimer, the term of this patent is extended or adjusted under 35 U.S.C. 154(b) by 1713 days.

This patent is subject to a terminal disclaimer.

(21) Appl. No.: 10/302,137

(22) Filed: Nov. 22, 2002

Related U.S. Application Data

(60) Provisional application No. 60/385,262, filed on May 31, 2002.

(51) Int. Cl.
*H04Q 7/00* (2006.01)

(52) U.S. Cl. ............... 370/328; 370/338; 370/340; 370/331; 455/406; 455/428; 455/433; 455/443; 455/445

(58) Field of Classification Search ............... 370/353, 370/352, 356, 328, 338, 340, 331; 455/406, 455/428, 433, 443, 445, 446, 451
See application file for complete search history.

(56) References Cited

U.S. PATENT DOCUMENTS

| | | | |
|---|---|---|---|
| 6,795,701 B1* | 9/2004 | Baker et al. | 455/411 |
| 2002/0089949 A1* | 7/2002 | Bjelland et al. | 370/331 |
| 2002/0133457 A1* | 9/2002 | Gerlach et al. | 705/39 |
| 2002/0159420 A1* | 10/2002 | Naqvi et al. | 370/338 |
| 2002/0184391 A1* | 12/2002 | Phillips | 709/248 |
| 2003/0051041 A1* | 3/2003 | Kalavade et al. | 709/229 |
| 2003/0117948 A1* | 6/2003 | Ton et al. | 370/218 |
| 2003/0117983 A1* | 6/2003 | Ton et al. | 370/338 |
| 2003/0196105 A1* | 10/2003 | Fineberg | 713/200 |

OTHER PUBLICATIONS

Cisco System, "GPRS White Paper", Copyright 2000 Cisco System, Inc., pp. 1 through 19.

* cited by examiner

*Primary Examiner*—Vincent P Harper
*Assistant Examiner*—Fred A Casca
(74) *Attorney, Agent, or Firm*—Pillsbury Winthrop Shaw Pittman LLP

(57) ABSTRACT

The present disclosure provides a system and method for providing a flexible architecture for attaching computing devices to wireless networks.

23 Claims, 21 Drawing Sheets

FLEXIBLE ARCHITECTURE FOR WIRELESS COMMUNICATION NETWORKS

RELATED APPLICATION

The present application claims the benefit of U.S. Provisional Application No. 60/385,262, filed on May 31, 2002.

BACKGROUND OF THE INVENTION

The present disclosure relates generally to a communications system and, more particularly, to a method and apparatus for a flexible architecture for wireless communication networks.

Today most wireless network providers require use of base stations within their wireless networks and are limited in many ways.

Therefore, what is needed, is a flexible architecture for mobile computing devices to access wireless networks while also minimizing costs and additional hardware costs.

SUMMARY OF THE INVENTION

The present disclosure provides a system and method for providing a flexible architecture for attaching computing devices to wireless networks.

Therefore, in accordance with the previous summary, objects, features and advantages of the present disclosure will become apparent to one skilled in the art from the subsequent description and the appended claims taken in conjunction with the accompanying drawings.

DETAILED DESCRIPTION OF THE PREFERRED EMBODIMENTS

Figure 1:
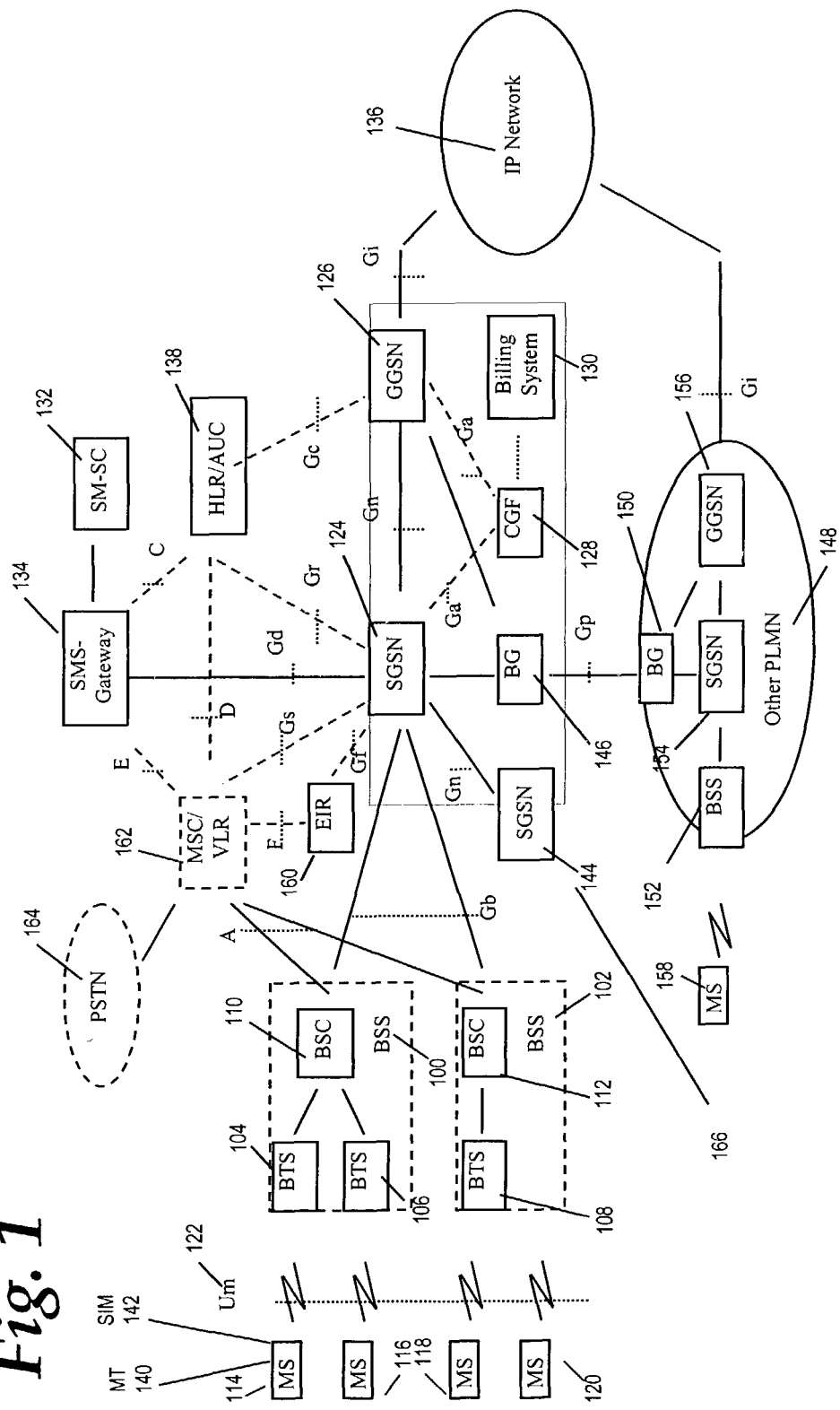
FIG. 1 illustrates an example of a GPRS network architecture.

The present disclosure can be described by the embodiments given below. It is understood, however, that the embodiments below are not necessarily limitations to the present disclosure, but are used to describe a typical implementation of the invention. A list of definitions and abbreviations will first be described and then the details of the embodiment will be described.

DEFINITIONS AND ABBREVIATIONS

| | |
|---|---|
| 2G | Second generation; generic name for second generation of digital mobile networks (such as GSM) |
| 2.5G | 2G mobile system enhanced with higher data rates and generally including packet radio transmission and switching such as GPRS |
| 3G | Third generation; generic name for next-generation mobile networks (UTMS, cdma2000; sometimes GPRS with an enhanced radio system is also called 3G in North America) |
| AAA | Authentication, Authorization, and Accounting |
| AuC | Authentication Center |
| BG | Border Gateway |
| BGP | Border Gateway Protocol |
| BSC | Base Station Controller |
| BSS | Base Station System |
| BTS | Base Transceiver Station |
| CDMA | Code Division Multiple Access; wireless access protocol |
| CDR | Call Detail Record |
| CGF | Charging Gateway Functionality |
| EIR | Equipment Identity Register |
| ESP | Enhanced Security Protocol |
| ETSI | European Telecommunications Standards Institute |
| Gb | Interface between a SGSN and a BSS |
| Gc | Interface between a GGSN and a HLR |
| Gd | Interface between a SMS-Gateway and a SGSN, and between a SMS-IWMSC and a SGSN |
| Gf | Interface between a SGSN and an EIR |
| GGSN | Gateway GPRS Support Node |
| Gi | Reference point between a GPRS and an external packet data network |
| Gn | Interface between two GSNs within the same PLMN (a GSN can be a SGSN or a GGSN) |
| Gp | Interface between two GSNs in different PLMNs |
| GPRS | General Packet Radio Service |
| Gr | Interface between a SGSN and a HLR |
| Gs | Interface between a GGSN and a MSC/VLR |
| GSM | Global System for Mobile communications; wireless standard |
| GW | Gateway |
| HDLC | High-level Data Link Control |
| HLR | Home Location Register |
| IMSI | International Mobile Subscriber Identity |
| IP | Internet Protocol |
| ISP | Internet Service Provider |
| IWMSC | Inter Working Mobile Switching Center |
| LLC | Logical Link Control |
| MAC | Medium Access Control |
| MM | Mobility Management |

-continued

| | |
|---|---|
| MS | Mobile Station |
| MSC | Mobile Services Switching Center |
| MT | Mobile Terminal |
| PDA | Personal Digital Assistant |
| PDN | Packet Data Network |
| PDP | Packet Data Protocol |
| PLMN | Public Land Mobile Network |
| PSTN | Public Switched Telephone Network |
| QoS | Quality of Service |
| RADIUS | Remote Authentication Dial-in User Service |
| RNC | Radio Network Controller (3G) |
| SGSN | Serving GPRS Support Node |
| SIM | Subscriber Identity Module |
| SMS | Short Message Service |
| SMSC | Short Message Service Center; also known as SMS-C and SM-SC |
| SS7 | Signaling System Number 7 |
| SMSC | Short Message Service Center |
| TDMA | Time-division Multiple Access Protocol; wireless protocol |
| Um | Radio interface between the MS and the GPRS network |
| UMTS | Universal Mobile Telecommunications System |
| VLR | Visitor Location Register |
| VPN | Virtual Private Network |
| WAIN | Wireless Access Internet Node |
| WISP | Wireless Internet Service Provider |
| WC | WAIN Client |
| WS | WAIN Server |

Now turning to FIG. 1 a General Packet Radio Service (GPRS) based mobile data network architecture is shown. GPRS is a new enhancement to GSM communications for supporting packet data transfer over a mobile network. GPRS is the basis for packet data service in a $3^{rd}$ Generation (3G) mobile standard called Universal Mobile Telecommunications System (UMTS). UMTS is one of the major new 3G mobile communications systems being developed within the framework which has been defined by the ITU and known as IMT-2000. The subject of intense worldwide efforts on research and development throughout the present decade, UMTS has the support of many major telecommunications operators and manufacturers because it represents a unique opportunity to create a mass market for highly personalized and user-friendly mobile access to tomorrow's "Information Society".

UMTS delivers pictures, graphics, video communications and other wide-band information as well as voice and data, directed to people who may be on the move. UMTS builds on and extends the capability of mobile technologies (like digital cellular and cordless) by providing increased capacity, data capability and a far greater range of services using an innovative radio access scheme and an enhanced, evolving core network. The packet domain of UMTS is based on GPRS. Some characteristics of GPRS include: a data rate up to 150+ kbps (on entire radio channel, 8 time slots); "always connected"-session active even without radio resource assigned; error detection and correction for reliability; security functions to protect mobile's identity and packet data transfer; roaming through a secure tunneling (over IP network); standardized IP protocols; and volume based charging.

The Base Station Systems (BSSs) 100, 102 are responsible for radio transmission, radio source management and access control. The BSSs 100, 102 include, Base Transceiver Station (BTS) 104, 106, 108 and Base Station Controllers (BSC) 110, 112. The BSSs 100, 102 serve the Mobile Stations (MSs) 114, 116, 118, 120 in their coverage area via a radio link 122.

One or more mobile BSSs 100, 102 are connected to a Serving GPRS Support Node (SGSN) 124 which performs packet switching and mobility management functions. Some SGSN functions include: Frame Relay based Gb interface to BS; GPRS attach, authentication, routing area updating, paging; coordination between GPRS and CS via Gs interface; PDP context activation/deactivation; encryption and error protection (LLC); compression and segmentation; Short Message Services (SMS) Control/Relay functions and Gd interface; GTP tunneling over Gn/Gp interface; Gr interface to HLR; and charging data collection (S-CDR, M-CDR, SMS-CDRs) and Ga interface to CGF.

The SGSN 124 also detects MSs 114, 116, 118, 120 in the local area for the transmission and receipt of packets. Additionally, the SGSN 124 locates and identifies the status of MSs 114, 116, 118, 120 and gathers crucial call information, which is an essential aspect of billing. Accordingly, the SGSN 124 is connected to the Charge Gateway Function (CGF) 128, which in turn is connected to the Billing System 130. In addition to providing mobility management and connectivity between the BSSs 100, 102 and the Gateway GPRS Serving Node 126, other key SGSN 124 functions include ciphering, compression and interaction with GSM circuit switched services for mobile paging and SMS. The SGSN 124 in this embodiment is connected to the Short Message Service Center (SM-SC) 132 through the SMS Gateway 134.

One or more SGSNs 124 can be connected to a GGSN 126 for interworking with external IP Network (also known as PDN for Packet Data Network) 136. The GGSN 126 acts as a gateway between GSM networks and public IP networks. Some of the GGSN functions include: a Gn Interface (similar to SGSN's); Packet Data Routing and Relay; PDP context activation and deactivation; address translation and mapping; packet store/forward and sequencing; Gi Interface; IP internetworking including transparent IP access and non-transparent IP access requiring authentication; interworking for other PDP types (PPP, OSP); Gc interface to HLR; and charging data collection (G-CDR) and Ga interface to CGF.

The GGSN 126 can connect directly to the Internet using IP over a variety of physical and tunneling protocols. The GGSN 126 can also function as a firewall, to ensure that all incoming and outgoing data is authorized adding security to an enterprise network. In addition to providing GSM connectivity to external data networks such as the Internet, the GGSN 126 includes all standard based functionality and even more with authentication, encryption, routing, firewall filtering, bandwidth and system management.

Moreover, there is a database called Home Location Register (HLR) 138 connected to the SGSN 124 and GGSN 126 that stores subscription data for all mobile users that are subscribed in any particular home network 140. Further, an MS's security information is stored in an Authentication Center (AuC) 138 (depicted as the same entity as the HLR in this figure) which communicates with the SGSN 124 via the HLR 138 for authentication purposes.

In the GSM/GPRS architecture, a MS 114 consists of a Mobile Terminal (MT) 140 and a Subscriber Identity Module (SIM) 142 (both MT and SIM are shown as the same entity as MS in this figure). The MT 140 supports the radio interface communicating with the BSS 100 and the SIM 142 card stores a subscriber's subscription and security information (there is also a Universal Subscriber Identity Module defined in the UMTS standard).

The SIM 142, the MT 140, the SGSN 124 and the AuC 138 are the only entities involved in the security procedure in this embodiment. In particular, the SIM 142 in MS 114 and the AuC 138 are the two authenticating entities where a unique authentication key (Ki) is stored for each mobile subscriber. The authentication information is exchanged between the MT 140 and SGSN 124. However, the SIM 142 is the key to the personalized service, security and billing. Before a MS 114 can use any GPRS services, it must attach itself to the network 140 through a GPRS Attach procedure, as dictated within the GPRS standard. More details are discussed in co-pending U.S. patent application Ser. No. 10/200,994 which is incorporated by reference above.

Now referring to the rest of the GPRS architecture depicted, the SGSN 124 is also shown connected to another SGSN 144 and Border Gateway 146. The BG 146 in turn connects this network 140 to another Public Land Mobile Network (PLMN) 148 with its own BG 150, a BSS 152, another SGSN 154 and a GGSN 156, along with its MS 158. The BG 150 provides security for communication between two networks.

The SGSN 124 is also connected to an Equipment Identity Register (EIR) 162 and a MSC/VLR 162, which in turn is connected to the Public Switched Telephone Network (PSTN) 164.

Figure 2:
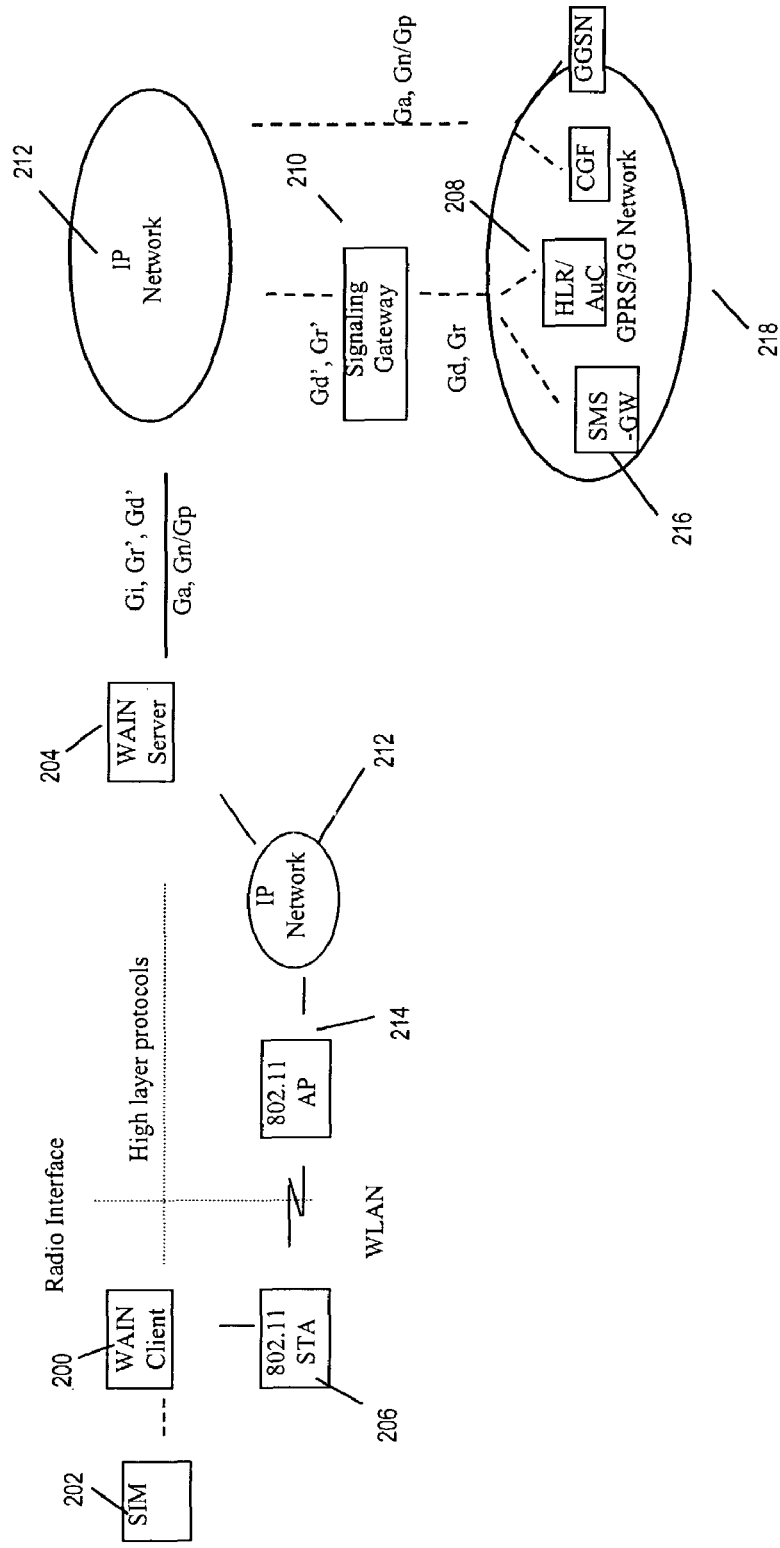
FIG. 2 illustrates the Wireless Access Internet Node (WAIN) system utilizing the 802.11 radio transport.

Now turning to FIG. 2, the flexible architecture of the Wireless Access Internet Node (WAIN) technology of the invention is shown. The WAIN system integrates the GPRS network and security functionality with an independent high speed radio system such as IEEE 802.11. The WAIN system consists of a WAIN Client (WC) 200 and a WAIN Server (WS) 204 in the network. The WAIN supports wireless Internet access and data transfer at a high speed while providing connectivity to the mobile network for mobility, security and billing services. The WC 200 supports high layer GPRS terminal functions, interfaces to the SIM card and adapts to the underlying radio system 206, which in this case is 802.11.

The WS 204 supports the GPRS network functions of the SGSN, and the GGSN and interfaces to a HLR/AuC 208 through a SS7 Gateway 210. The WS 204 also connects through the IP network 212 to the 802.11 Access Point (AP) 214, that in turn communicates with the 802.11 Station (STA) module 206 in the WC 200. By combining the multiple network elements into one single node, all unnecessary intermediate interfaces and protocols are removed in the WS 204. Therefore, the system architecture can be greatly simplified and cost can be significantly reduced compared to the conventional mobile network architecture. More detail about the WAIN technology can be found in co-pending U.S. application Ser. No. 09/851,681, which is commonly assigned. The radio link adaptation in both the WC 200 and the WS 204 also allows the WAN architecture to support multiple radio technologies. More details follow on the methodology implemented to support multiple radio technologies.

In addition to the HLR/Auc 208 node, the SS7 gateway 210 also connects the WS 204 to a SMS-Gateway (SMS-GW) 216 within the GPRS/3G network 218 shown. The GPRS/3G network also shows a CGF 220 and a GGSN 222 that connect to the WS 204 through the IP network 212.

Figure 3:
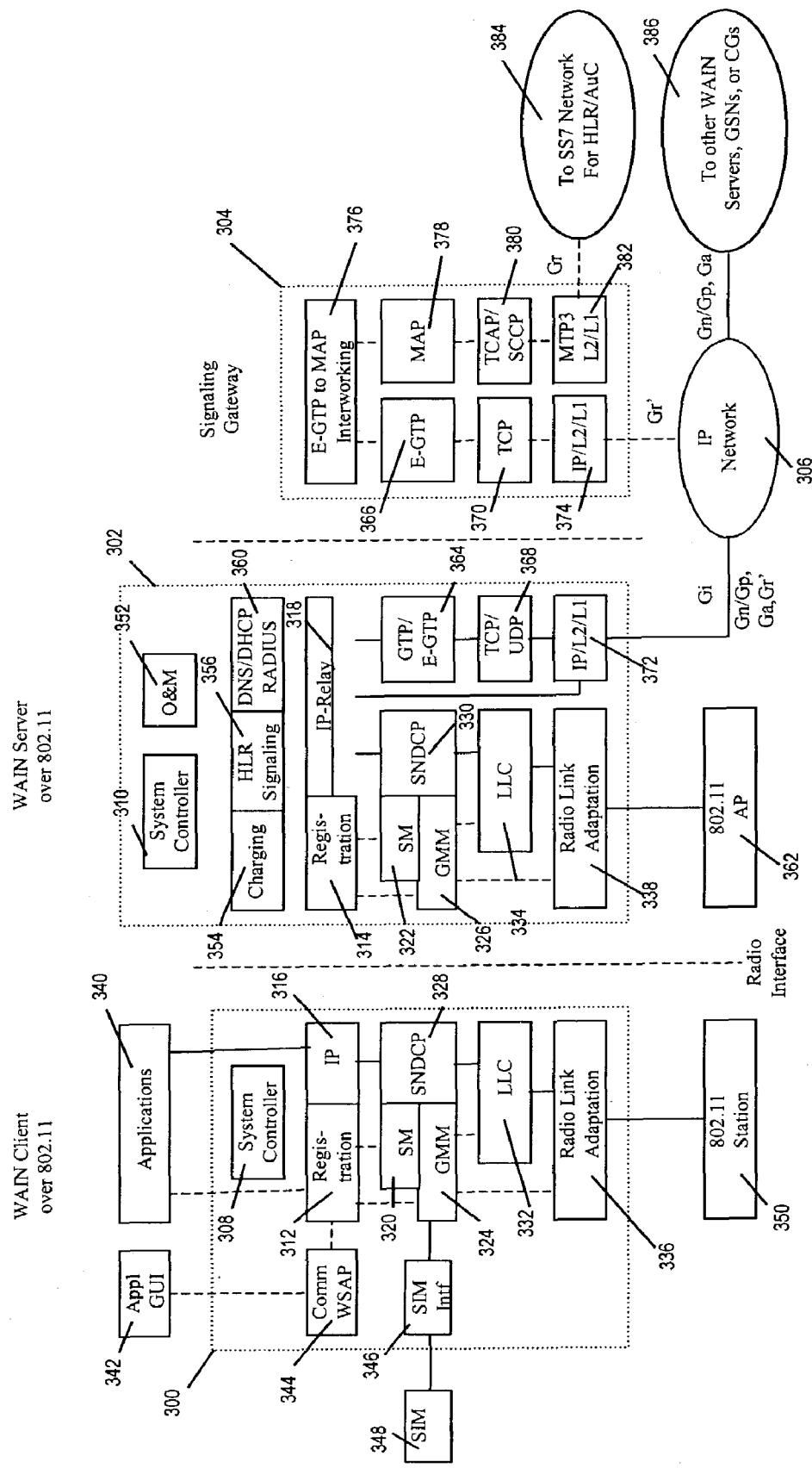
FIG. 3 shows details of the system elements of the WAIN client, the WAIN server and the SS7 gateway of the WAIN system.

Now turning to FIG. 3, the system elements of the WC 300 and the WS 302 are shown as they are adapted to communicate over the 802.11 radio transport. In addition, the system elements of the SS7 Gateway 304 are also shown, along with the connections between IP network 306 and the WS 302 and the SS7 Gateway 304.

The peer system elements in the WC 300 and the WS 302 include: system controllers 308, 310; registration modules 312, 314; IP Relay modules 316, 318; SM modules 320, 322; GMM modules 324, 326; SNDCP modules 328, 330; LLC modules 332, 334; and Radio Link Adaptation modules 336, 338, respectively. In addition, the WC 300 also contains an applications layer 340 and an applications GUI 342, a Comm WSAP (WAIN Service Access Point) 344, a SIM interface 346 connected to a SIM card 348, and a 802.11 station module 350.

The WS 302 also contains an Operation and Maintenance (O&M) module 352, a charging module (for billing) 354, a HLR signaling module 356, a DNS/DHCP RADIUS module 360, and an 802.11 AP 362.

The peer modules between the WS 302 and the SS7 Gateway 304 include: GTP/E-GTP modules 364, 366; TCP/UDP and TCP modules 368, 370; and IP/L2/L1 modules 372, 374. The SS7 Gateway also includes a E-GTP to MAP Interworking module 376, a MAP module 378, a TCAP/SCCP module 380, and a MTP/L2/L1 module 382. The WS 302 connects to the SS7 Gateway 304 which in turn connects to the SS7 network and specifically to any HLR/AuC that is utilized for authentication purposes. Additionally, the IP network 306 is connected to the other WAIN servers, GGSNs, or CGFs 386.

Figure 4:
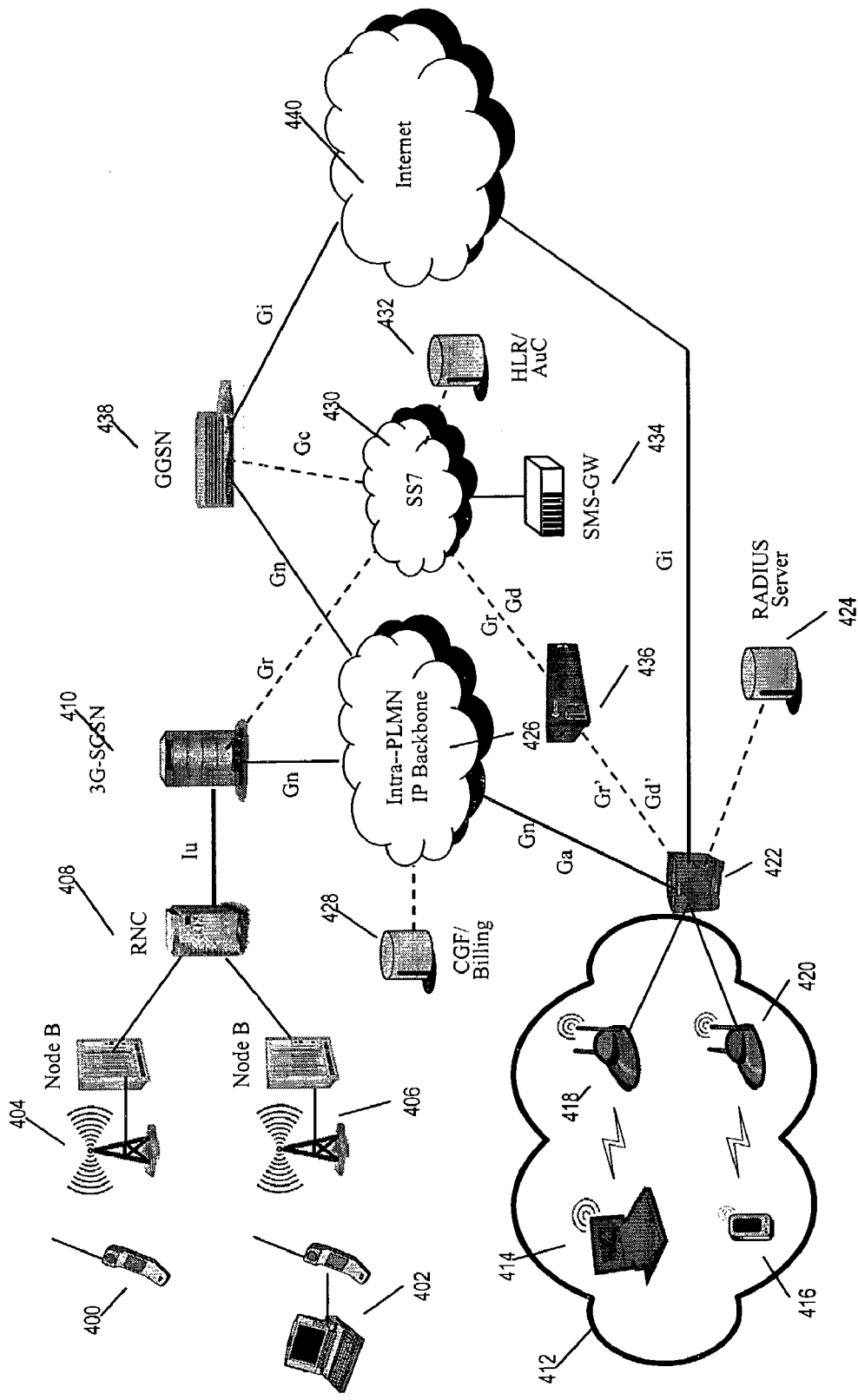
FIG. 4 illustrates the WAIN system connected to the UMTS core network.

Now turning to FIG. 4, the WAIN system is depicted connected to the UMTS core network in another example of the flexibility of the WAIN architecture. In this embodiment, two MSs 400, 402 are connected to two Node Bs 404, 406, and in turn connected to a RNC 408 which is connected to a 3G-SGSN 410. In addition, the 802.11 WLAN 412, which includes two WAIN Clients 414, 416, connected to two APs 418, 420, and connects to the WAIN server (WS) 422. In turn, the WS 422 connects to the RADIUS server 424 for User ID/Password authentication, and the Intra-PLMN IP Backbone 426 to connect to the data network and the CGF/Billing server 428. Moreover, the WS 422 connects to the HLR/AuC 432 and the SMS-GW 434 through the SS7 Gateway 436 and the SS7 Network 430. Also depicted in this figure, is a GGSN 438 and the public Internet 440.

Figure 5:
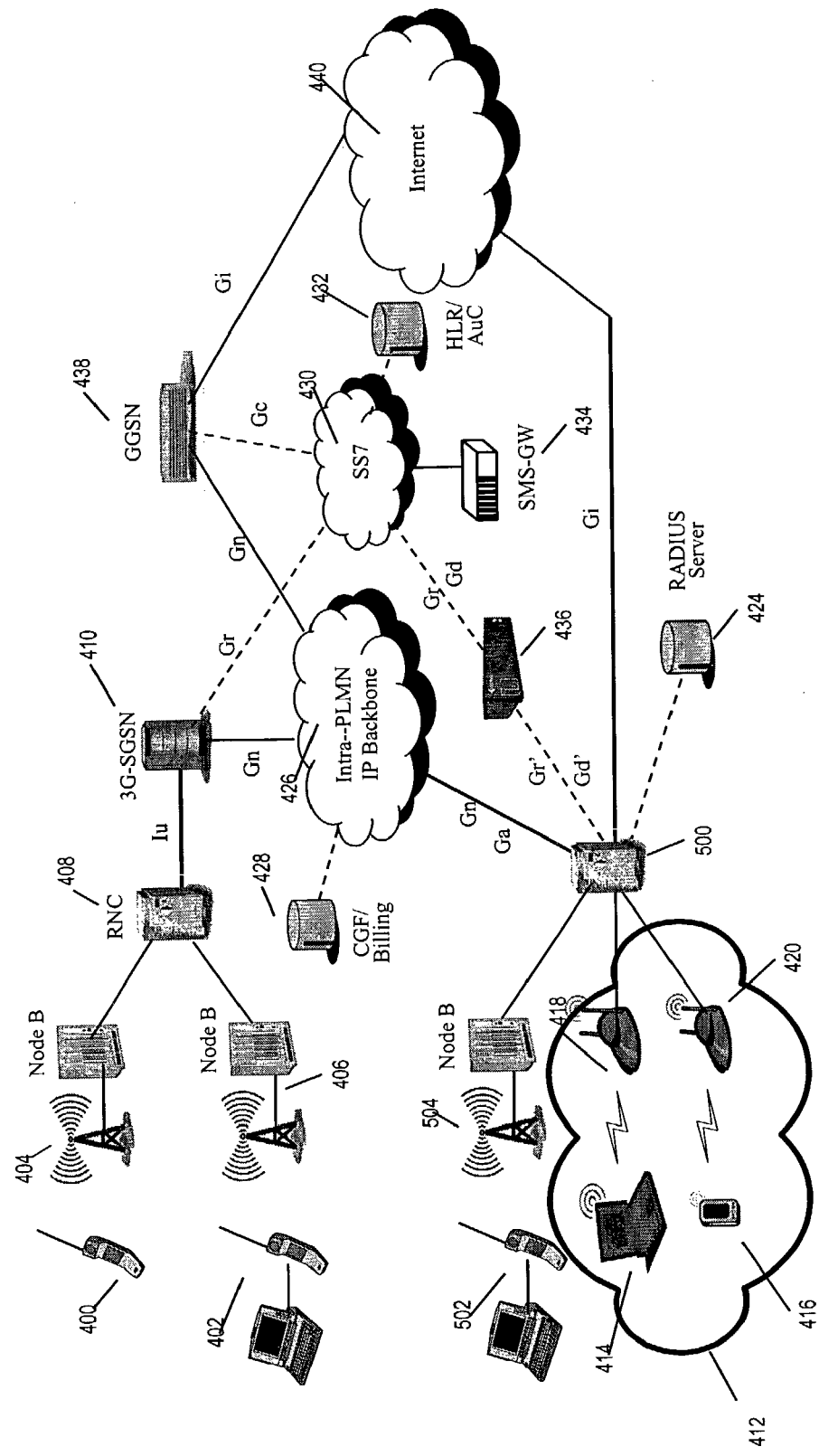
FIG. 5 illustrates the WAIN server integrated with a 3G RNC.

FIG. 5 illustrates another example of the flexibility of the WAIN architecture wherein a WAIN server is shown integrated with a 3G RNC. Although most elements are similar to FIG. 4, the WS is integrated with a 3G RNC and depicted as WS/3G RNC 500. Additionally, a MS 502 is shown connected to a Node B 504 which in turn is connected to the combined WS/3G RNC 500.

Figure 6:
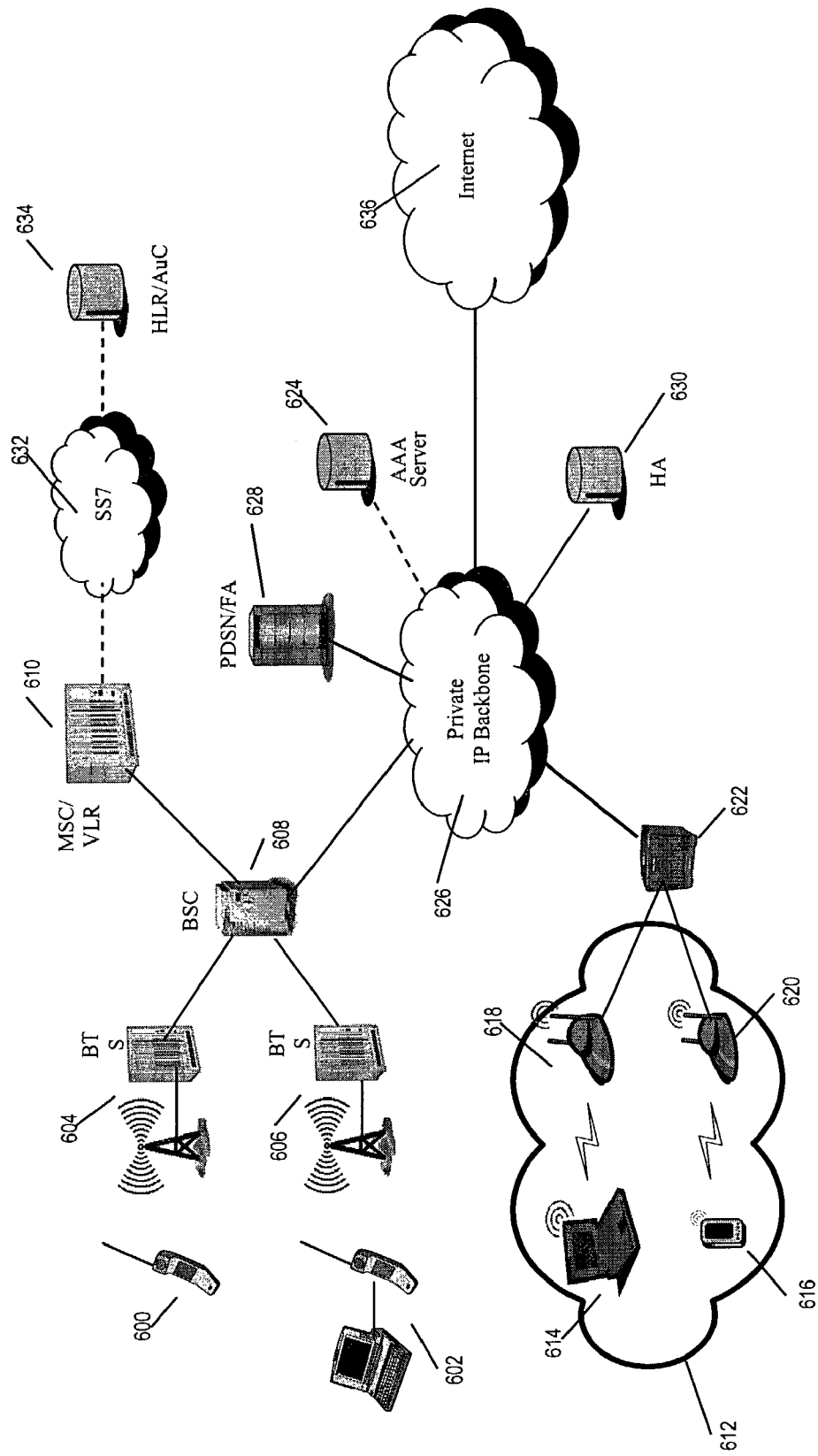
FIG. 6 illustrates the WAIN system connected to a cdma2000 network.

FIG. 6 illustrates yet another configuration of the WAIN architecture. In this figure, the WAIN system is shown connected to a cdma2000 network. Specifically, two MTs 600, 602 are connected to two BTS 604, 606, and in turn connected to a BSC 608 which is connected to a MSC/VLR 610 and a private IP backbone 626. In addition, the 802.11 WLAN 612, which includes two wireless SIM users 614, 616, connected to two APs 618, 620, and connects to the WAIN server (WS) 622. In turn, the WS 622 connects to the AAA server 624 for authentication, the HA (Home Agent) 630 and the PDSN/FA (Foreign Agent) 628 through the Private IP Backbone 626. Moreover, the MSC/VLR 610 connects through the SS7 Network 632 to the HLR/AuC 634. Also depicted in the this figure, is the public Internet 636 connected to the WS 622 through the private IP backbone 626.

Figure 7:
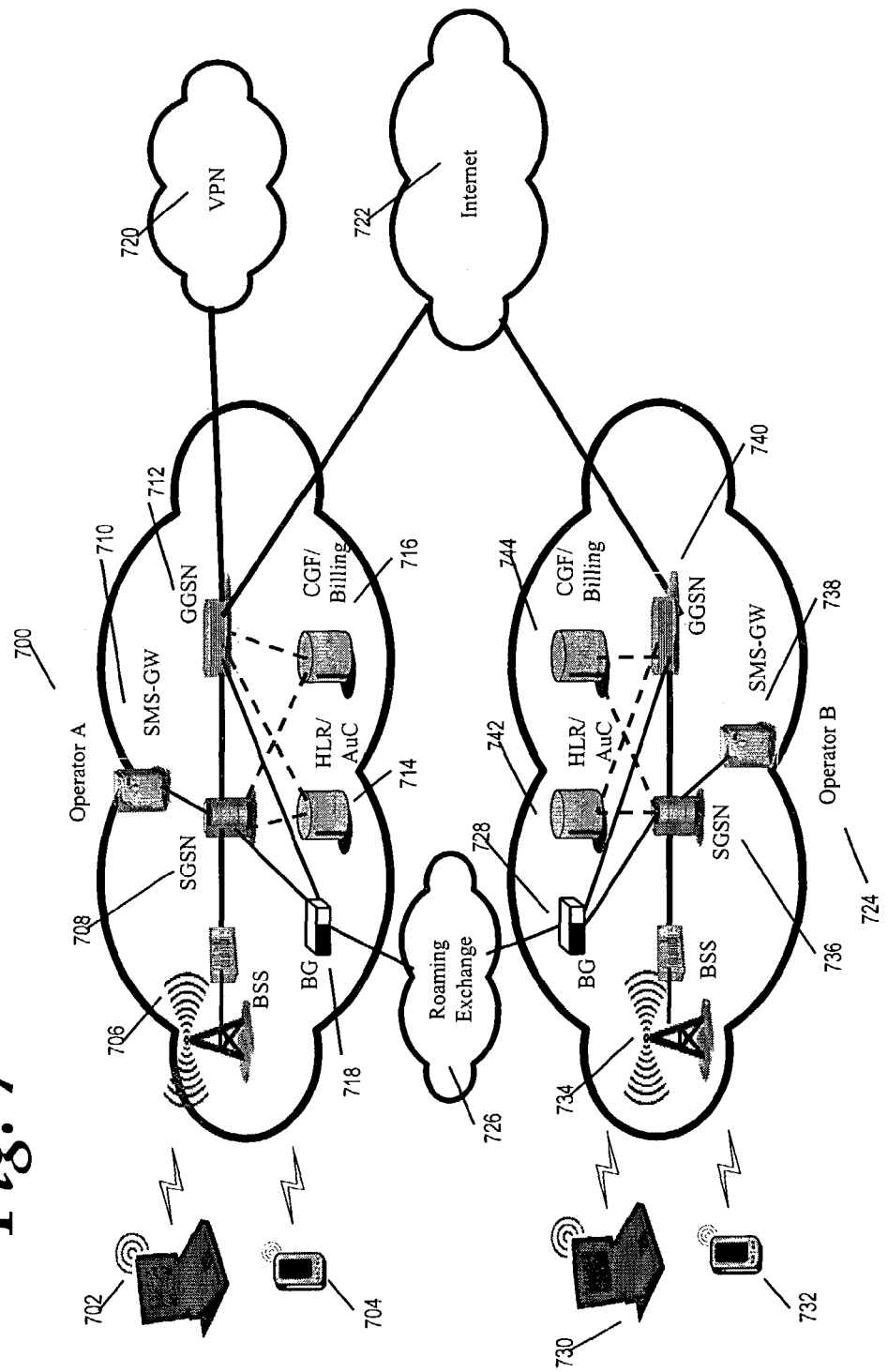
FIG. 7 illustrates GPRS networks with a roaming arrangement.

Now turning to FIG. 7, two GPRS networks with a roaming arrangement are depicted. Operator A's network 700 includes MSs 702, 704 connected to the a BSS 706 and SGSN 708. Moreover, a SMS-GW 710, a GGSN 712, a HLR/AuC 714 and a CGF/Billing server 716 are connected to the SGSN 708, as well as BG 718. The GGSN 712 is connected to a VPN 720 and the public Internet 722.

In turn the BG 718 connects to Operator B's network 724 through a Roaming exchange network 726 to Operator B's BG 728. In addition, Operator B's network 724 also includes MTs 730, 732 connected to the a BSS 734 and SGSN 736. Moreover, a SMS-GW 738, a GGSN 740, a HLR/AuC 742 and a CGF/Billing server 744 are connected to the SGSN 736. The GGSN 740 is also connected to the public Internet 722.

Figure 8:
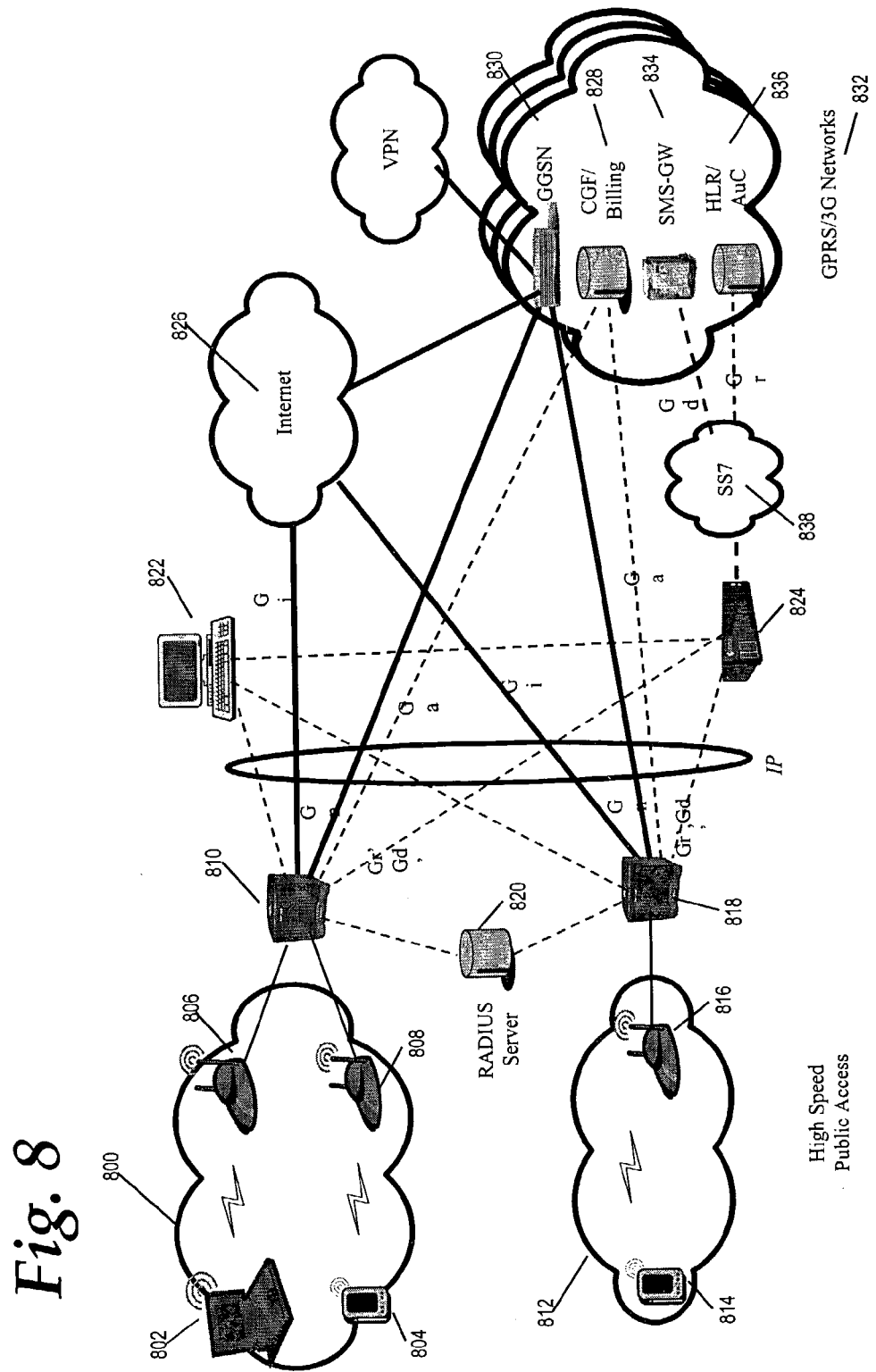
FIG. 8 illustrates a WAIN system supporting roaming users in GPRS/3G networks.

FIG. 8 illustrates the WAIN architecture with more than one WAIN server and the ability to support roaming users in GPRS/3G networks. Within one WLAN 800, two WCs 802, 804 are shown connected to two Access Points 806, 808 which are connected to WS 810. Another WLAN 812 is shown with one WC 814 and one Access Point 816 connected to another WS 818. The WSs 810, 818 are in turn connected to the public Internet 826 and the HLR/AuC 836 and SMS-GW 834 through the SS7 Gateway 824 and the SS7 Network 838. In addition, the WSs 810, 818 are also connected to a RADIUS server 820 for non-SIM authentication purposes, an O&M Control Station 822, a CGF/Billing server 828 and a GGSN 830, both within a GPRS/3G network 832. However, the WAIN System can connect to multiple GPRS/3G networks.

In this embodiment, authentication can be accomplished in one of two methods. One method is utilizing the RADIUS server for non-SIM users. However, this method can sometimes be costly and difficult to manage. Another method is to transport the SIM information to the WAIN servers 818, 810 which forward to the HLR/AuC 836 through the SS7 gateway 824 to obtain authentication information for authenticating the client.

Figure 9:
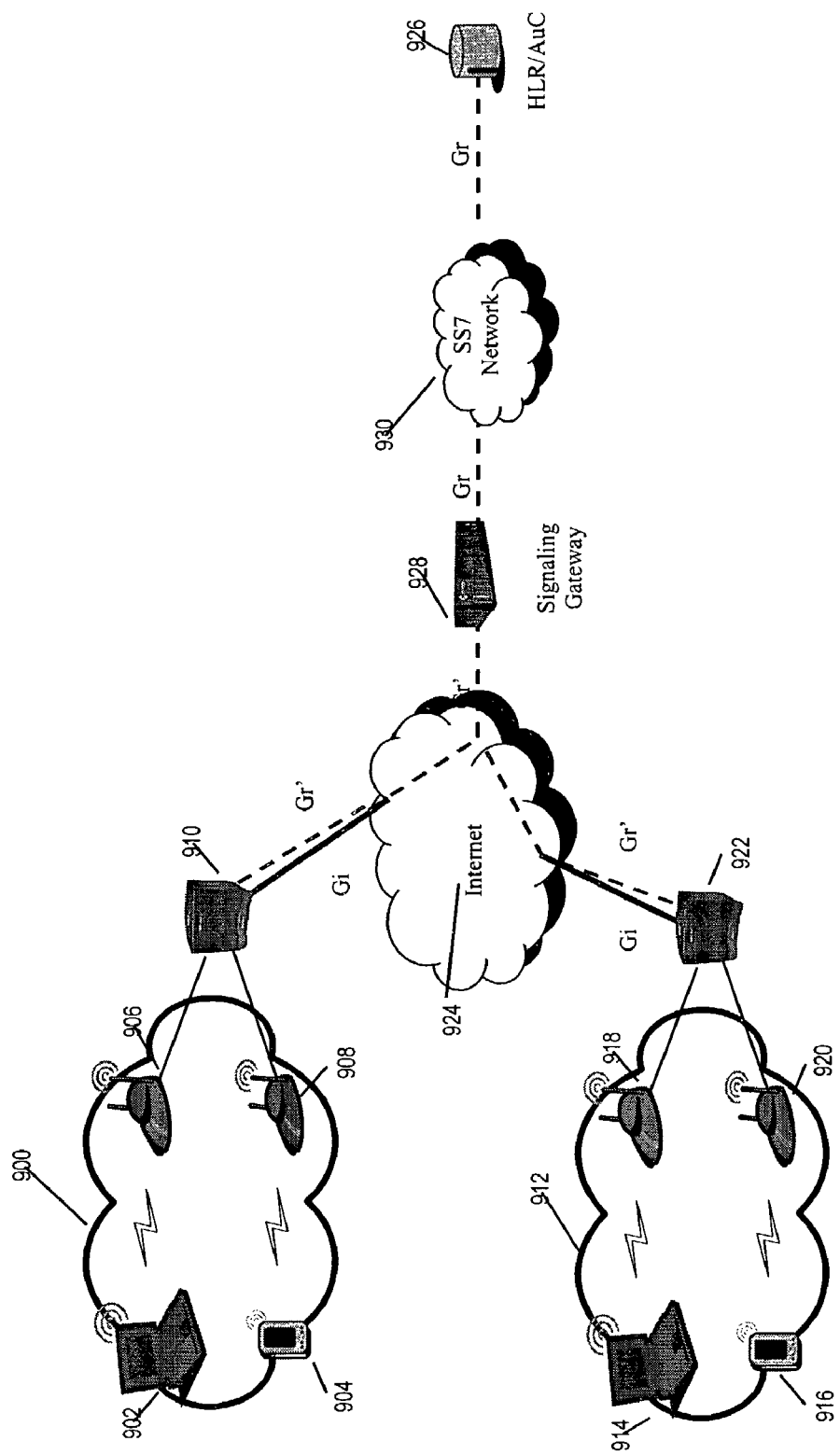
FIG. 9 illustrates the WAIN system connected to the SS7 network through a SS7 Gateway.

Now turning to FIG. 9, the WAIN system is shown connected to the SS7 network through a SS7 Gateway. Within one WLAN 900, two WCs 902, 904 are shown connected to two APs 906, 908 which are connected to WS 910. Another WLAN 912 is shown with two WCs 914, 916 and two APs 918, 920 connected to another WS 922. The WSs 910, 922 are in turn connected to the public Internet 924. Moreover, the WSs 910, 922 also connect to the a HLR/AuC 926 through a SS7 Gateway 928 and the SS7 Network 930.

Figure 10:
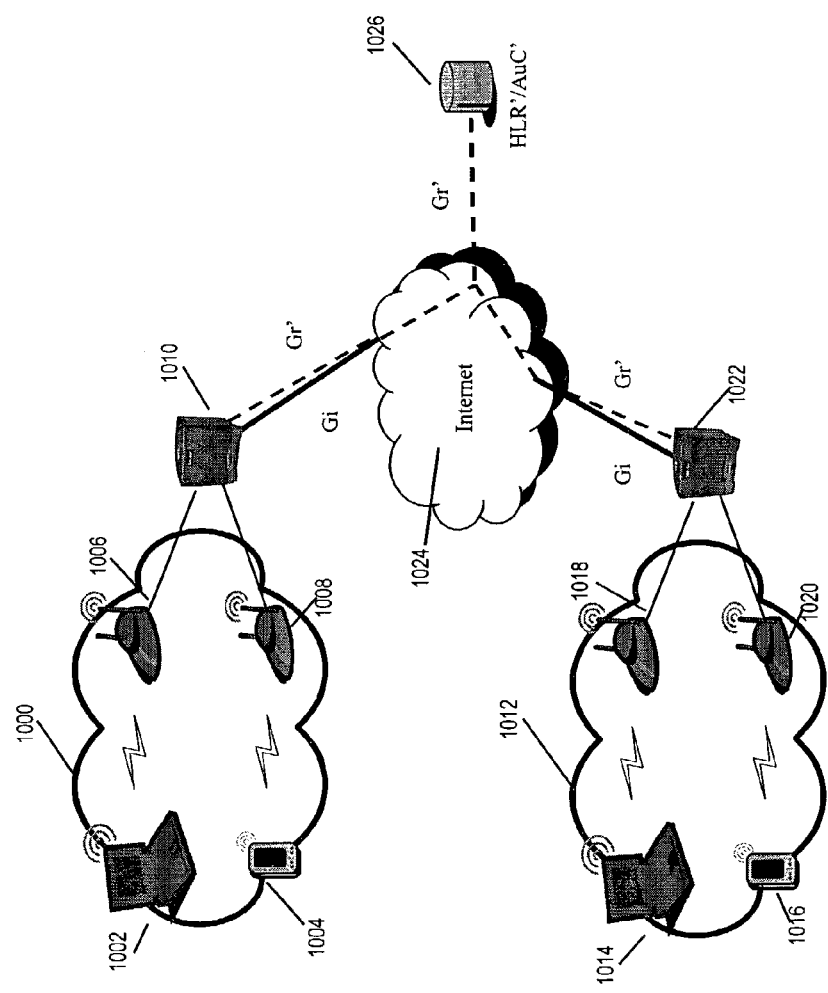
FIG. 10 illustrates the WAIN system with a subscription/authentication database HLR'/AuC' with an IP interface.

Now turning to FIG. 10, the WAIN system is shown with a subscription/authentication database HLR'/AuC' with an IP interface. Within one WLAN 1000, two WCs 1002, 1004 are shown connected to two APs 1006, 1008 which are connected to WS 1010. Another WLAN 1012 is shown with two WCs 1014, 1016 and two APs 1018, 1020 connected to another WS 1022. The WSs 1010, 1022 are in turn connected to the public Internet 1024. However, unlike FIG. 9, this figure connects the WSs 1010, 1022 to the HLR'/AuC' 1026 without the use of a SS7 Gateway or a SS7 Network.

Figure 11:
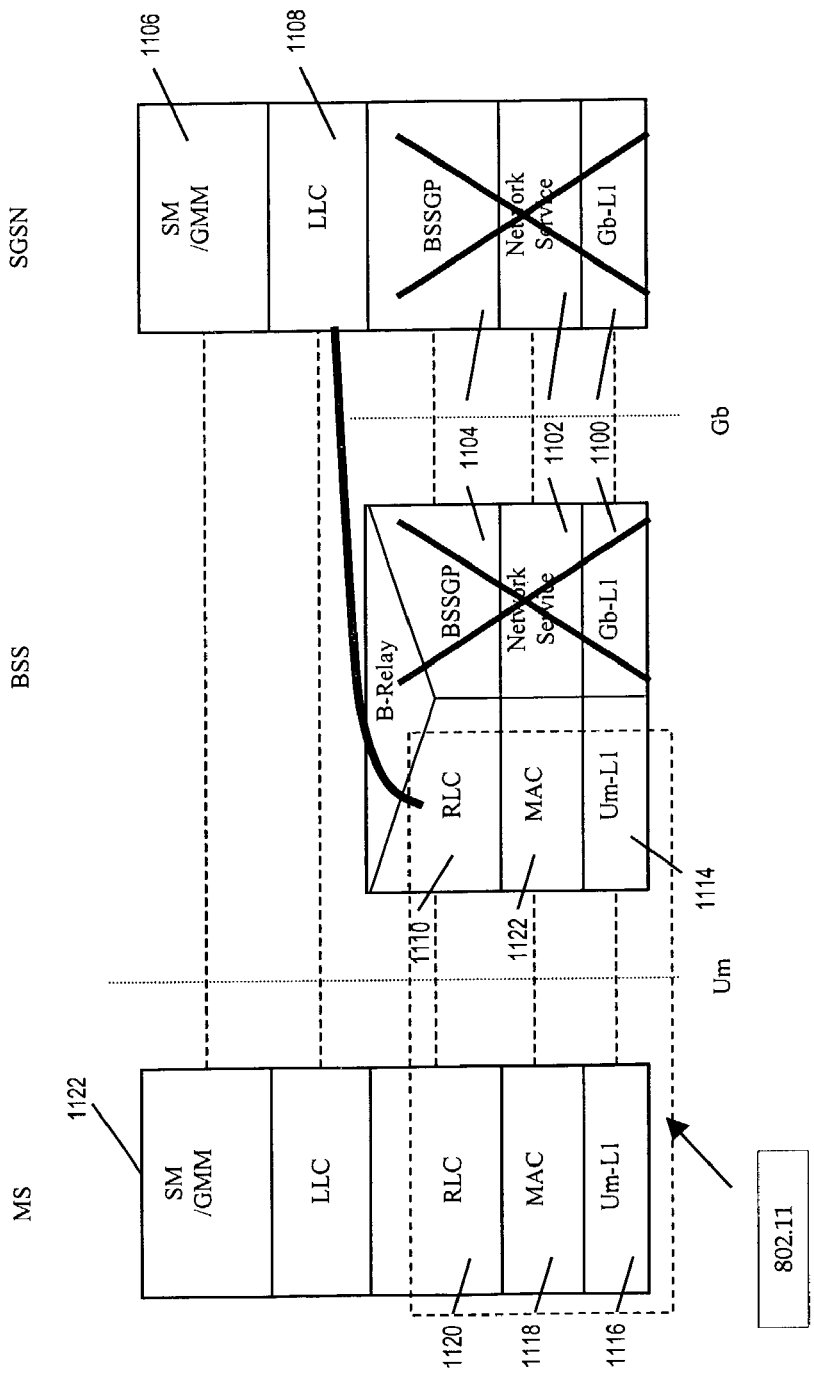
FIG. 11 illustrates how the WAIN signaling protocol is simplified.

Now turning to FIG. 11, the WAIN signaling protocol is shown. Instead of the having the Gb-L1 layer 1100, the network service layer 1102 and the BSSGP layer 1104 in the SGSN and the BSS in a conventional GPRS system, the WAN server eliminates them and lays just the SM/GMM layer 1106 and the LLC layer 1108 on top of the RLC layer 1110, the MAC layer 1112 and the Um-L1 layer 1114. In turn the RLC layer 1110, the MAC layer 1112 and the Um-L1 layer 1114 communicate directly with the corresponding layers 1116, 1118, 1120 in the MS 1122. The RLC, MAC and Um-L1 can be replaced by the 802.11 protocol layers.

Figure 12:
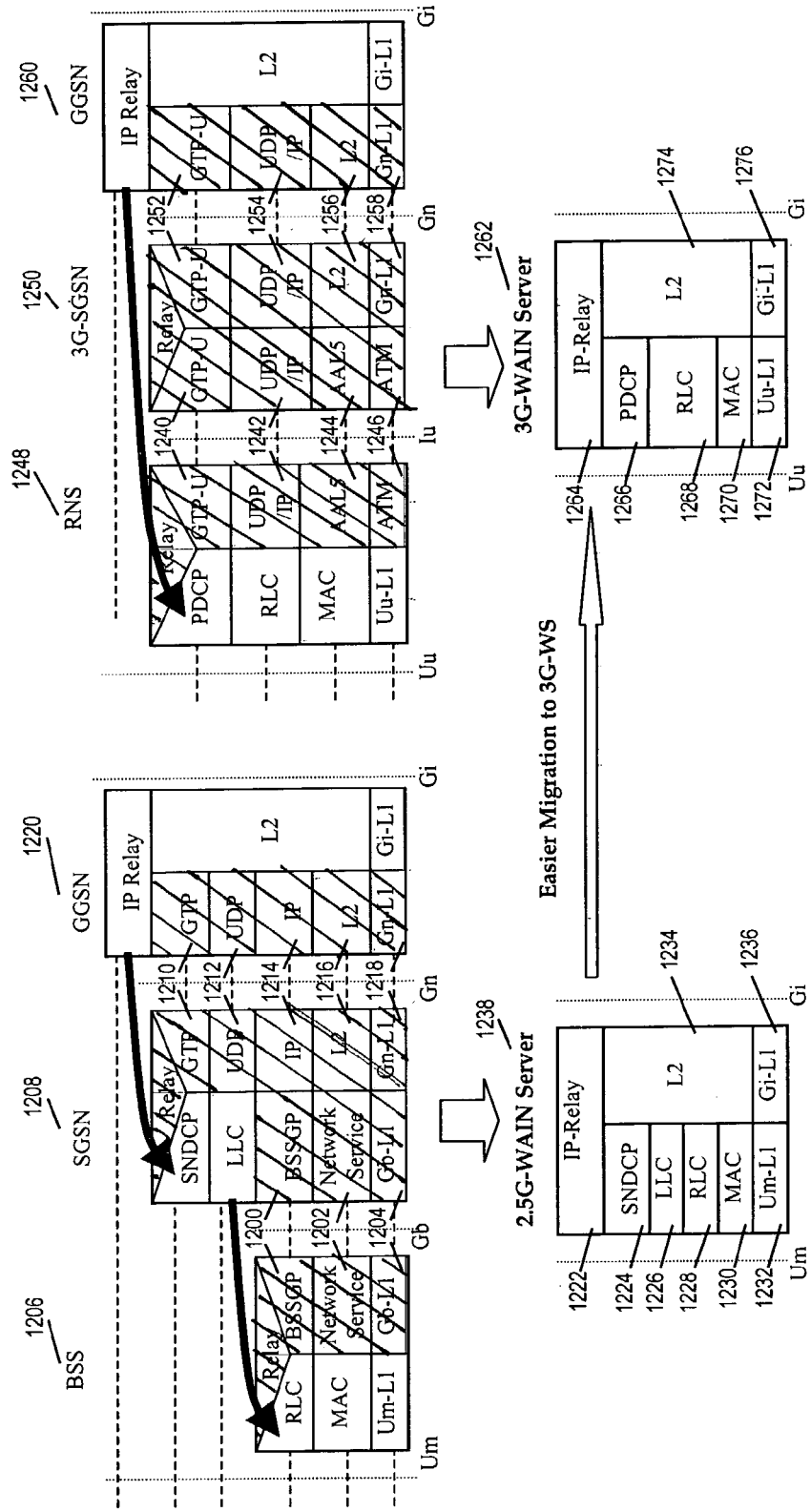
FIG. 12 illustrates GPRS data protocol migration from 2.5G to 3G.

Now turning to FIG. 12, data protocol migration from 2.5G to 3G is depicted. When the WAIN server replaces the conventional 2.5G BSS/SGSN/GGSN, the BSSGP 1200, the Network Service 1202, and the Gb-L1 1204 layers are eliminated in the BSS 1206 and the SGSN 1208. Additionally, the GTP 1210, the UDP 1212, the IP 1214, the L2 1216 and the Gn-L1 1218 layers are also eliminated from the SGSN 1208 and the GGSN 1220. The simplified 2.5G WAIN server 1238 thus includes the IP Relay layer 1222, the SNDCP layer 1224, the LLC layer 1226, the RLC layer 1228, the MAC layer 1230, the Um-L1 layer 1232, the L2 layer 1234 and the Gi-L1 layer 1236.

Moreover, since the 3G WAIN server eliminates the GTP-U 1240, the UDP/IP 1242, the AAL5 1244 and the ATM 1246 layers are eliminated in the RNS 1248 and the SGSN 1250. Additionally, the GTP-U 1252, the UDP/IP 1254, the L2 1256 and the Gn-L1 1258 layers are also eliminated from the SGSN 1250 and the GGSN 1260. The simplified 3G WAIN server 1262 therefore includes the IP Relay layer 1264, the PDCP layer 1266, the RLC layer 1228, the MAC layer 1270, the Uu-L1 layer 1272, the L2 layer 1274 and the Gi-L1 layer 1276. In sum, the intermediate interfaces are eliminated; Frame Relay and ATM are eliminated in the WAIN server; the PDCP layer is similar to the SNDCP layer; the LLC and the RLC are combined in the 3G server; and the major differences are in the MAC and U-L1 layers, but they can also be replaced by 802.11.

Figure 13:
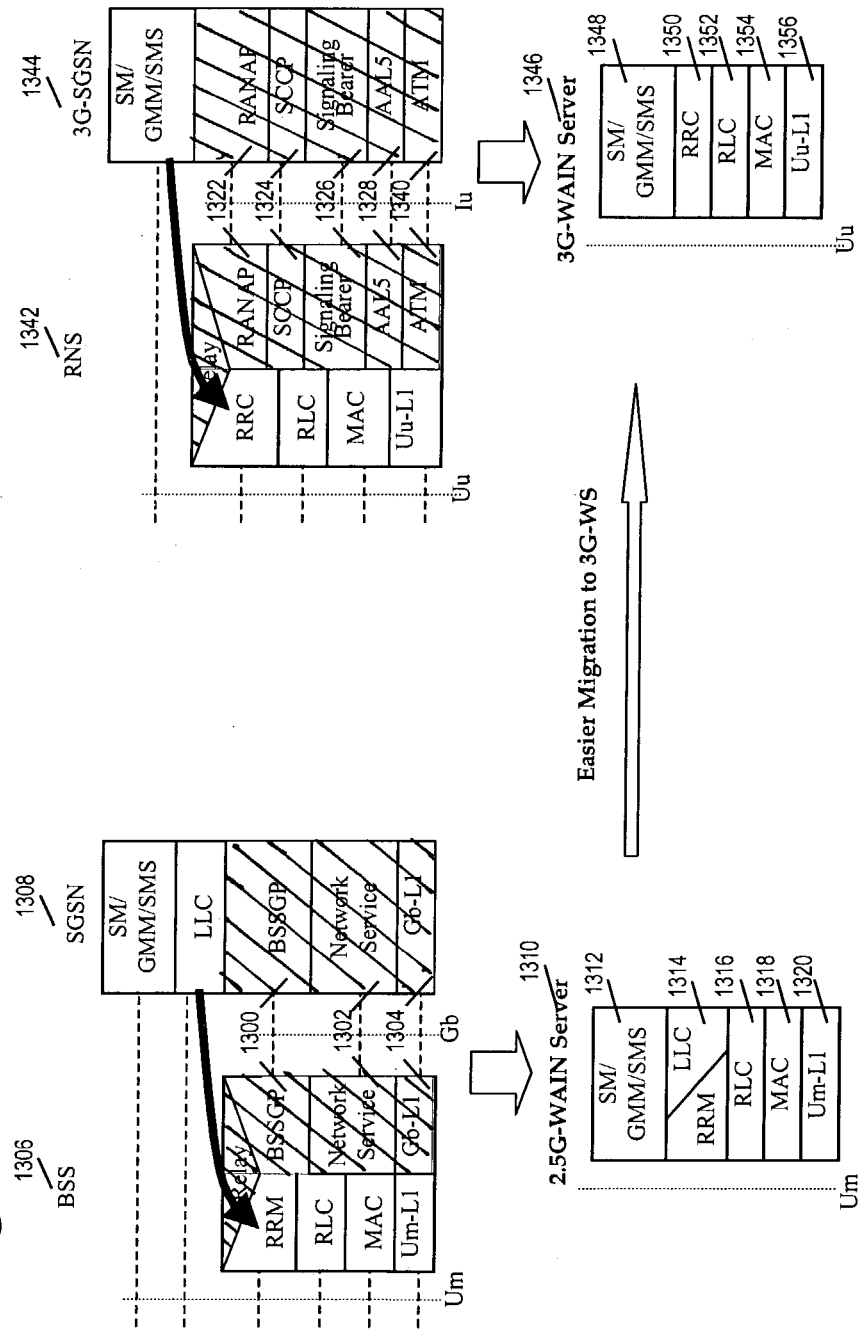
FIG. 13 illustrates GPRS control protocol migration from 2.5G to 3G.

Now turning to FIG. 13, control protocol migration from 2.5G to 3G is depicted. When the WAIN server replaces the conventional 2.5G BSS/SGSN/GGSN, the BSSGP 1300, the Network Service 1302, and the Gb-L1 1304 layers are eliminated in the BSS 1306 and the SGSN 1308. The simplified 2.5G WAIN server 1310 thus includes the SM/GMM/SMS layer 1312, the RRM/LLC layer 1314, the RLC layer 1316, the MAC layer 1318, and the Um-L1 layer 1320.

Furthermore, since the 3G WAIN server eliminates the RANAP 1322, the SCCP 1324, the Signaling Bearer 1326, the AAL5 1328 and the ATM 1340 layers are eliminated in the RNS 1342 and the SGSN 1344. The simplified 3G WAIN server 1346 therefore includes the SM/GMM/SMS layer 1348, the RRC layer 1350, the RLC layer 1352, the MAC layer 1354, and the Uu-L1 layer 1356. In sum, the Gb/Iu interfaces are eliminated; there is no Frame Relay and ATM in the WAIN server; the SM/GMM/SMS layers are similar; and the major differences are the MAC and U-L1 layers, but can be replaced by 802.11.

Figure 14:
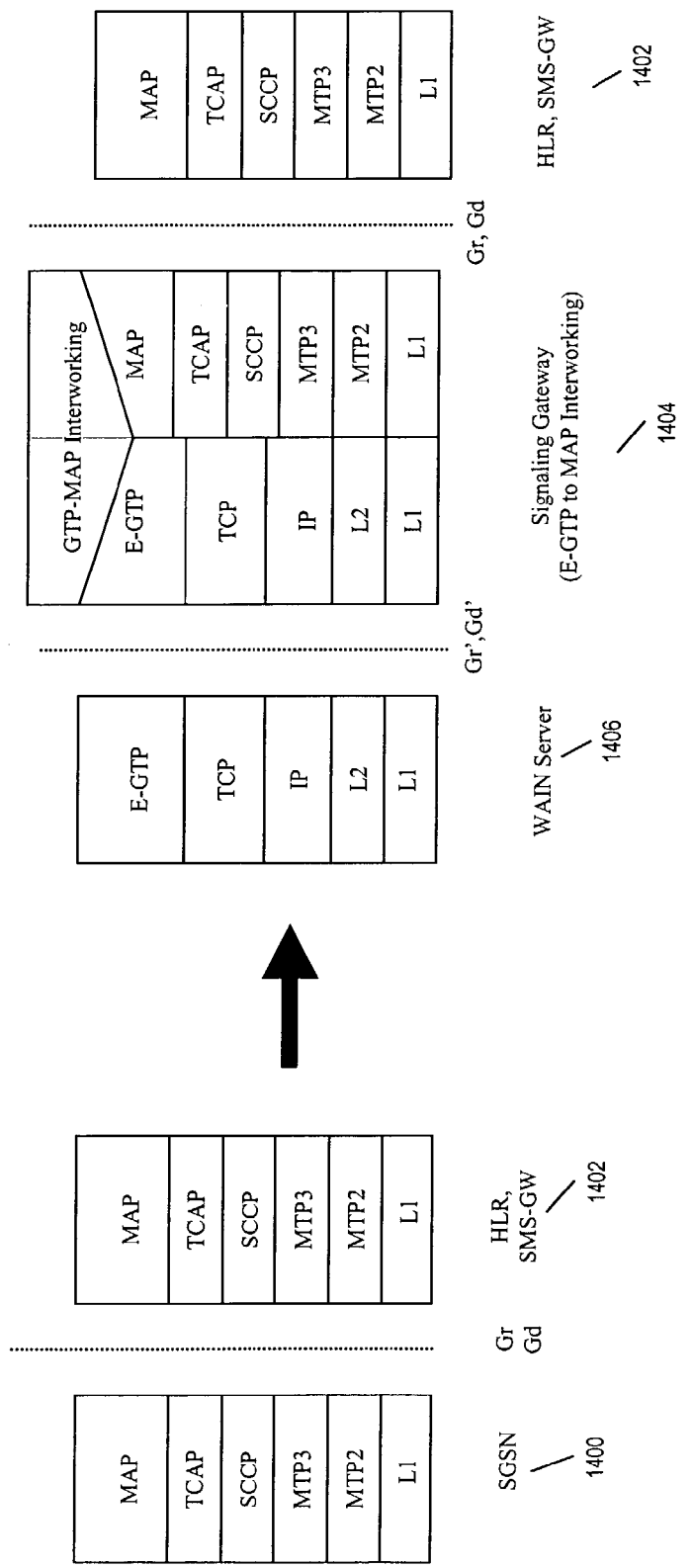
FIG. 14 compares the SGSN/HLR/SMS-GW interface to the WAIN server/HLR/SMS-GW interface via the SS7 Gateway.

Now turning to FIG. 14 the SGSN/HLR/SMS-GW interface is compared to the WAIN Server/HLR/SMS-GW interface via the SS7 Gateway. In a conventional GPRS architecture, the SS7 layers of an SGSN 1400 communicate directly to the peer layers of HLR or SMS-GW 1402. However, in the WAIN architecture, the SS7 gateway 1404 maps the IP based layers of the WAIN server 1406 to the SS7 layers of HLR or SMS-GW 1402.

In sum, the WAIN system centralizes the SS7 stack in the SS7 gateway 1404 which performs E-GTP/IP to MAP/SS7 conversion for the Gr and Gd interfaces. Accordingly, this conversion makes all network interfaces IP based. Therefore, the overall signaling architecture is greatly simplified and becomes very cost effective.

Figure 15:
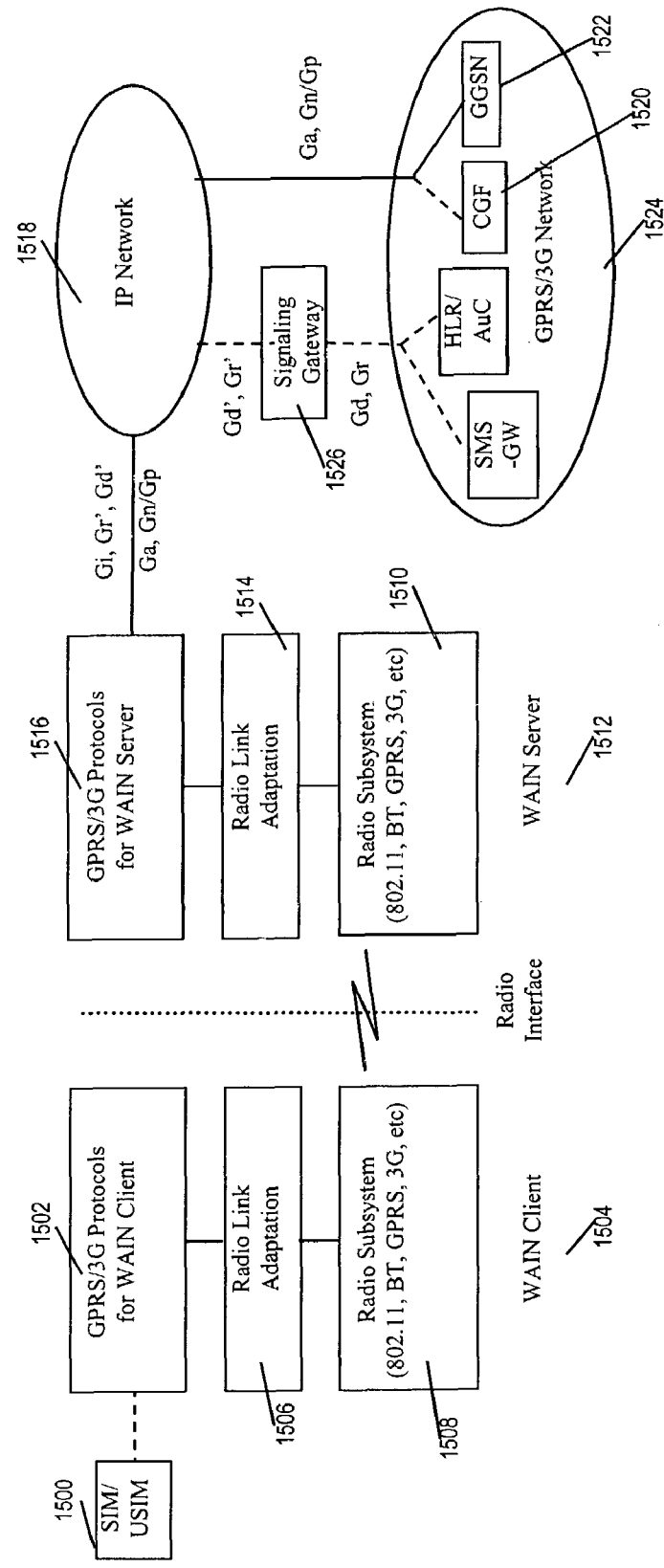
FIG. 15 focuses on how the GPRS/3G protocols are adapted to the Packet Radio Subsystem in the WAIN architecture.

FIG. 15 illustrates how the GPRS/3G protocols are conceptionally adapted to the Packet Radio Subsystem in the WAIN architecture. As depicted, the SIM module 1500 communicates directly with the GPRS/3G protocols 1502 in the WAIN client 1504. In turn those protocols 1502 are directly linked to the Radio Link adaptation layer 1506 and then to the Radio Subsystem 1508. In turn, the Radio Subsystem 1508 of the WAIN client 1504 communicates directly to the Radio Subsystem 1510 of the WAN server 1512, which in turn is linked to the its respective Radio Link adaptation layer 1514 and its protocols 1516. The division of the Radio Link adaptation layer and the Radio Subsystem allow the WAN system architecture to accommodate multiple radio protocols. For example, although 802.11, BlueTooth, 3G and GPRS are illustrated, the WAIN system could also be adapted for 802.15, HIPERLAN and other types of wireless protocols.

The WAIN server protocols 1516 connect the WAIN server to the IP network, which in turn is connected directly to the CGF 1520 and any GGSNs 1522 in the GPRS/3G network 1524. Also, through the SS7 gateway 1526, the IP network is connected to the SMS-GW 1528, and the HLR/AuC 1530. Such an architecture allows packet radio (e.g. 802.11) to provide high-speed and low-cost radio communication. In addition, the GPRS/3G standard interfaces and protocols enable mobility, security and billing. Moreover, the GSM SIM card provides convenient subscriber data for authentication and billing.

Figure 16:
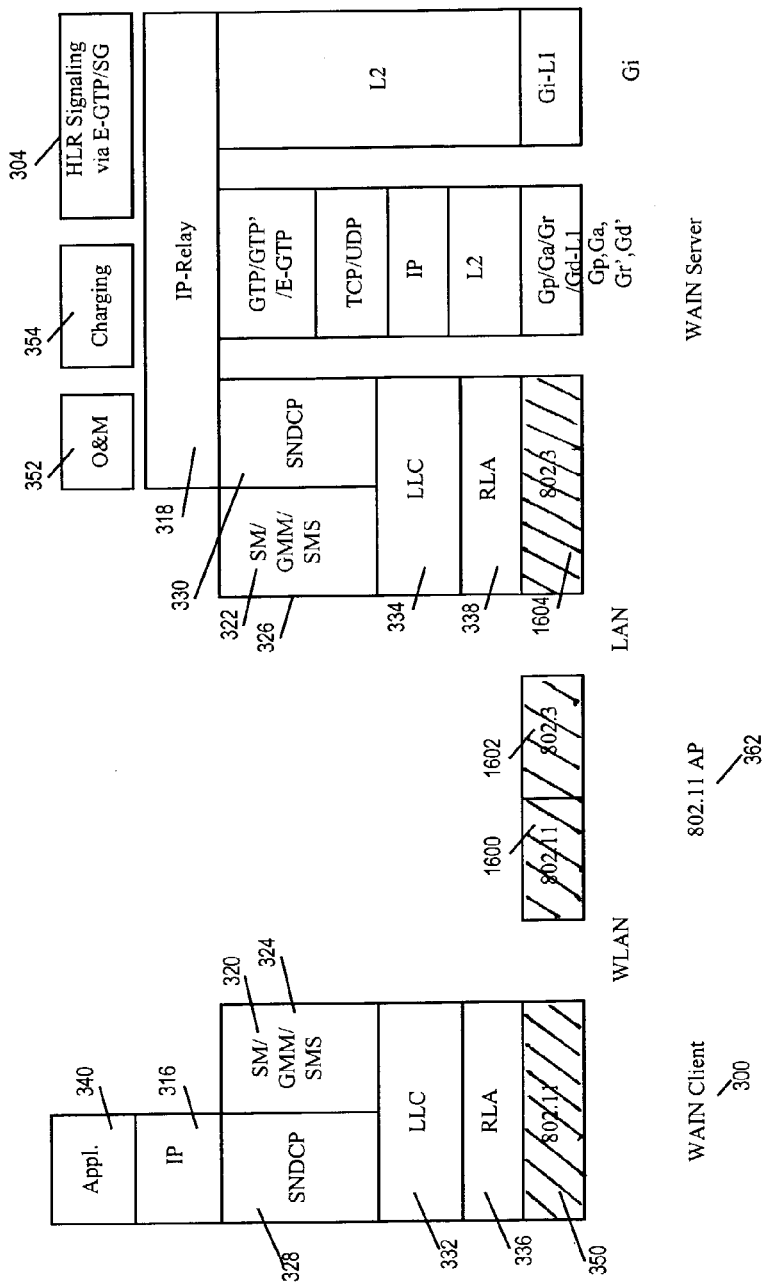
FIG. 16 illustrates GPRS data and signaling protocols for an integrated 2.5G/WAIN server over 802.11.

Now turning to FIG. 16, data and signaling protocols for an integrated 2.5G/WAIN server over 802.11 are shown. In comparison with FIG. 3, the WAIN client in this figure includes similar modules, but the 802.11 AP 362 in this is detailed as a 802.11 module 1600 that communicates to a 802.3 module 1602 that connects the AP 362 through a wired LAN to the 802.3 module 1604 in the WAIN server 302.

Figure 17:
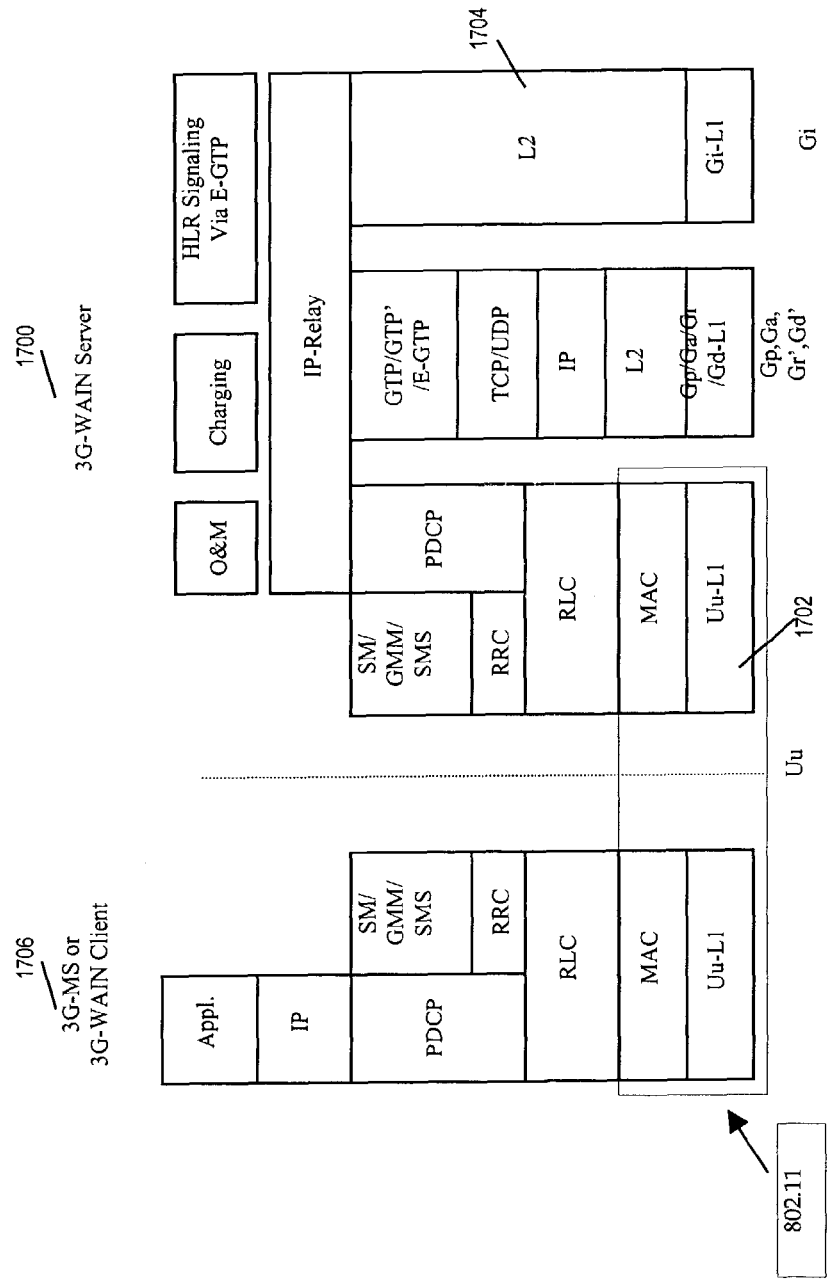
FIG. 17 illustrates 3G data and signaling protocols for an integrated RNC/3G/WAIN server.

Now turning to FIG. 17, data and signaling protocols for a 3G-WAIN Server are shown. The elements of the 3G-WAIN Server 1700 include the PDCP, the RLC, the MAC and the Uu-L1 layers, the SM/GMM/SMS, the IP Relay, the GTP/GTP'/E-GTP, the TCP/UDP, the IP, the L2 and L1 for Gp/GA/Gr/Gd, the L2 and L1 for Gi, the O&M, the Charging and the HLR Signaling modules. In addition, the 3G-MS or 3G-WAIN client functions 1706 are also shown. Moreover, the MAC and L1 layers 1708 can be replaced by the 802.11 radio protocol.

Figure 18:
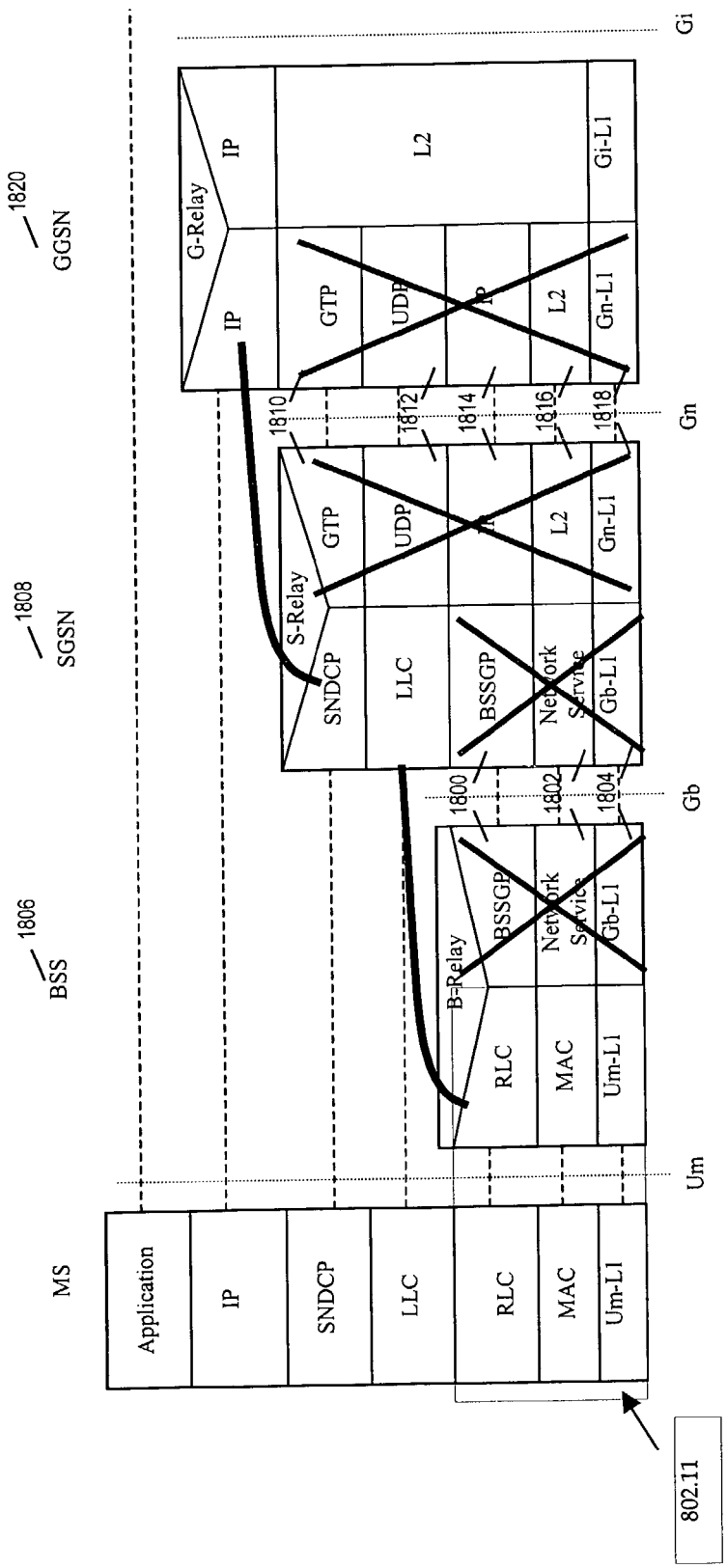
FIG. 18 illustrates how the GPRS user data transfer is simplified utilizing the WAIN system.

FIG. 18 illustrates how the GPRS user data transfer is simplified utilizing the WAIN system. As indicted by the figure, the BSSGP 1800, the Network service 1802, and the Gb-L1 1804 layers are eliminated from the BSS 1806 and the SGSN 1808, as well as the GTP 1810, the UDP 1812, the IP 1814, the L2 1816, and Gn-L1 1818 layers are eliminated from the SGSN 1808 and the GGSN 1820. In addition, the RLC 1822, the MAC 1824, and Um-L1 layers in the MS 1826 and the BSS 1806 can be replaced in this figure with 802.11.

Figure 19:
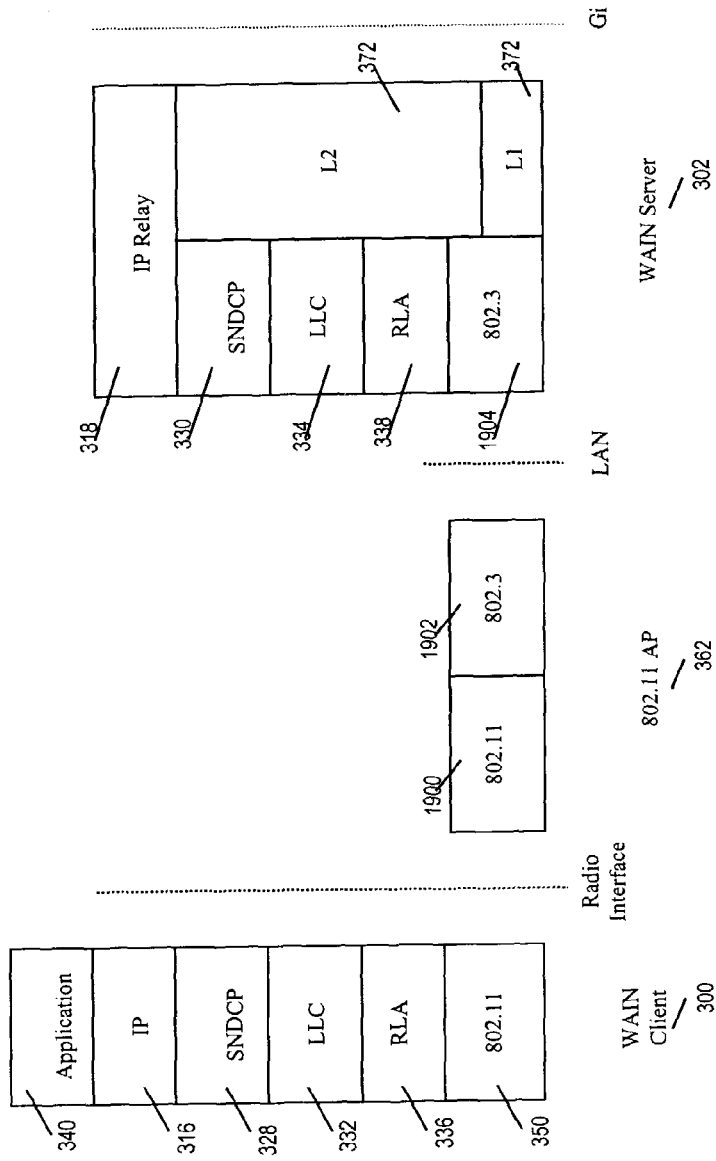
FIG. 19 illustrates how the GPRS data protocols are integrated with the WLAN protocols in the WAIN system.

FIG. 19 illustrates how the GPRS data protocols are integrated with the WLAN protocols in the WAIN system. In comparison with FIG. 3, the WAIN client in this figure includes similar modules, but the 802.11 AP 362 in this figure is detailed as a 802.11 module 1900 that communicates to a 802.3 module 1902 that connects the AP 362 through a wired LAN to the 802.3 module 1904 in the WAIN server 302.

Figure 20:
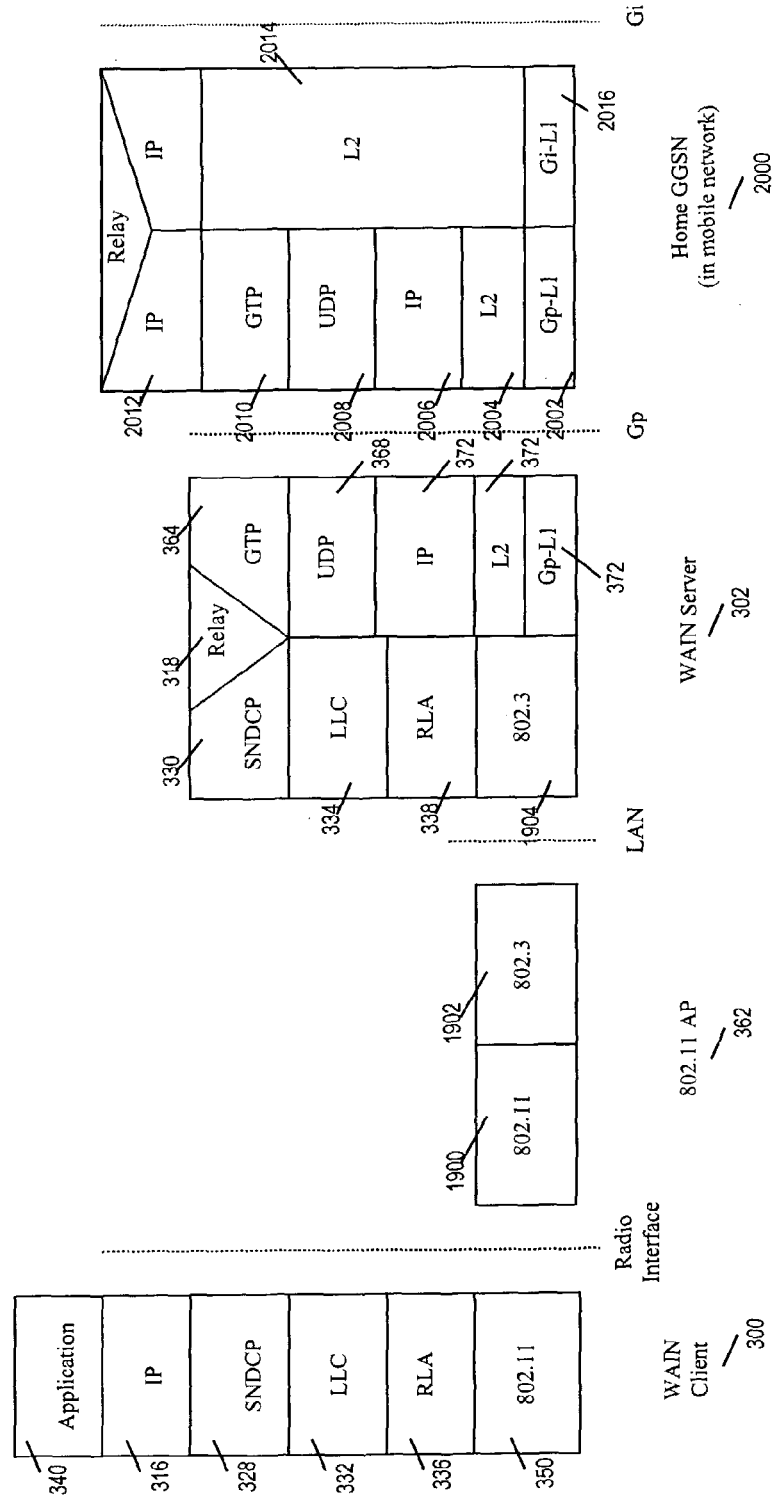
FIG. 20 illustrates how a WAIN server could connect to a home GGSN in a mobile network.

FIG. 20 illustrates how a WAIN server could connect to a Home GGSN in a mobile network. Similar to FIGS. 3 and 19, this figure shows how the protocol layers communicate between the WAIN client 300 and the WAIN server 302. However, this figure also shows the protocol layer communications from the WAIN server 302 and a Home GGSN 2000. Reciprocal layers to the WAIN server 302 in the GGSN include: the Gp-L1 2002, the L2 2004, the IP 2006, the UDP 2008, the GTP 2010, the IP Relay 2012, the L2 2014, and the Gi-L1 2016 layers.

Figure 21:
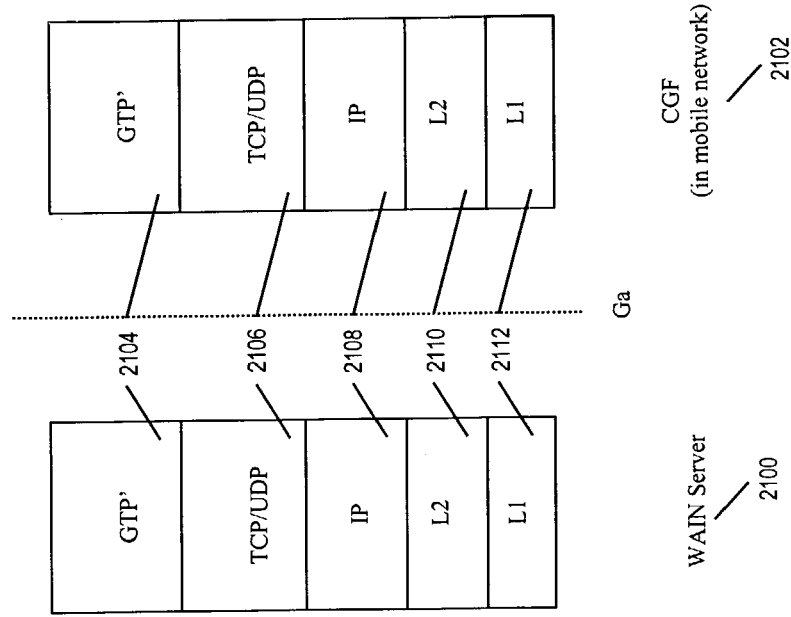
FIG. 21 focuses on the interface between the WAIN server and the CGF in the mobile network.

Now turning to FIG. 21, the interface between the WAN server and the CGF in the mobile network is described. The WAIN server 2100 and the CGF 2102 in the mobile network both contain GTP layers 2104, the TCP/UDP layers 2106, the IP layers 2108, the L2 layers 2110, and the L1 layers 2112. All Call Detail Records (CDRs) from the WAIN server are transmitted to the CGF through this interface.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A Wireless Access Internet Network architecture for providing users direct and roaming access to a communications network, the architecture comprising:
a wireless client wherein the wireless client provides an authentication and includes:
a radio link adaptation layer and a radio interface;
a plurality of wireless servers in communication with the wireless client wherein at least two of the plurality of wireless servers are in communication with each other and allow respective wireless clients within one network of the at least two of the plurality of wireless servers to roam within the other network of the at least two of the plurality of wireless servers and wherein each of the wireless servers include:
a charging module;
a Home Location Register (HLR) signaling module;
a Domain Naming System (DNS)/Dynamic Host Configuration Protocol (DHCP) Remote Authentication Dial-in User Service (RADIUS) module;
a radio link adaptation layer and a radio access point in communication with the radio interface;
a data network in communication with the plurality of wireless servers; and
a RADIUS server connected to the wireless server wherein the wireless server transmits accounting data to the RADIUS server.

2. The architecture of claim 1 further including a second wireless client in communication with at least one of the plurality of wireless servers.

3. The architecture of claim 1, further including:
a wireless mobile device with a cellular protocol; and
a base station system (BSS) in communication with the wireless mobile device and connected to the data network wherein at least one of the plurality of wireless servers can transmit messages from the wireless client to the wireless mobile device through the data network and the BSS.

4. The architecture of claim 1 further including:
a wireless mobile device with a wireless protocol;
a receiving system in communication with the wireless mobile device; and
a SGSN in communication with the receiving system and connected to the data network wherein at least one of the plurality of wireless servers can transmit messages from the wireless client to the wireless mobile device through the data network, the SGSN and the receiving system.

5. The architecture of claim 1 further including a charge and billing gateway device in communication with the plurality of wireless servers wherein the plurality of wireless servers transmit charge and billing information to the gateway device.

6. The architecture of claim 5 wherein the charge and billing information is formatted in a call detail record.

7. The architecture of claim 1, wherein the RADIUS server connected to the wireless server wherein the authentication includes a User ID and a password and wherein the wireless server transmits the User ID and password to the RADIUS server and the wireless server receives an appropriate approve/deny message back from the RADIUS server.

8. The architecture of claim 1 further including the HLR connected to the wireless server wherein the wireless sewer transmits an authentication information request message to the HLR and receives requested authentication data back from the HLR.

9. The architecture of claim 1 wherein the plurality of wireless servers allow the wireless client to roam while keeping a data session active.

10. The architecture of claim 1 wherein the plurality of wireless servers transfer messages for the wireless client while the wireless client is roaming from a home network to a roaming network.

11. The architecture of claim 1 further including:
a GPRS Gateway Support Node (GGSN) in communication with the plurality of wireless servers; and
a virtual private network in communication with the GGSN, wherein the wireless client is allowed access to the virtual private network through the GGSN.

12. A method for transmitting wireless messages from a Wireless Access Internet Network architecture for providing users direct and roaming access to a communications network, the method comprising:
transmitting a message from a wireless client wherein the message is transmitted through a radio link adaptation layer and a radio interface;
receiving the message by at least one of a plurality of wireless servers in communication with the wireless client through a radio link adaptation layer and a radio access point in communication with the radio interface wherein at least two of the plurality of wireless servers are in communication with each other and allow respective wireless clients within one network of the at least two of the plurality of wireless servers roam to within the other network of the at least two of the plurality of wireless servers and wherein each of the plurality of wireless servers include:
a charging module;
a Home Location Register (HLR) signaling module;
a Domain Naming System (DNS)/Dynamic Host Configuration Protocol (DHCP) Remote Authentication Dial-in User Service (RADIUS) module; and transmitting the authentication message from the at least one of the plurality of wireless servers to a data network; and
transmitting accounting data from the wireless servers to a RADIUS server.

13. The method of claim 12 further including transmitting from a second wireless client to the at least one of the plurality of wireless servers.

14. The method of claim 12 further including:
transmitting a plurality of messages from a wireless mobile device with a cellular protocol;
and
receiving the plurality of messages at a base station system (BSS) in communication with the wireless mobile device and connected to the data network wherein the at least one of the plurality of wireless servers call transmit messages from the wireless client to the wireless mobile device through the data network and the BSS.

15. The method of claim 12 further including:
transmitting a plurality of messages from a wireless mobile device with a wireless protocol;
receiving the plurality of messages at a receiving system in communication with the wireless mobile device; and
transmitting the plurality of messages from the receiving system to a SGSN in communication with the receiving system and connected to the data network wherein the at least one of the plurality of wireless server can transmit messages from the wireless client to the wireless mobile device through the data network, the SGSN and the receiving system.

16. The method of claim 12 further including transmitting billing information to a charge and billing gateway device in communication with the at least one of the plurality of wireless server.

17. The method of claim 16 wherein the transmitting the billing information is formatted in a call detail record.

18. The method of claim 12 further including transmitting a User ID and Password to the RADIUS server connected to the wireless server and receiving an appropriate approve/deny message back from the RADIUS server.

19. The method of claim 12 further including transmitting an authentication information request message to the HLR connected to the wireless server and receiving requested authentication data back from the HLR.

20. The method of claim 12 further including allowing the wireless client to roam while keeping a data session active.

21. The method of claim 12 further including transferring messages for the wireless client while the wireless client is roaming from a home network to a roaming network.

22. The method of claim 12 further including:
transmitting messages from the plurality of wireless servers to a GPRS Gateway Support Node (GGSN); and
transmitting messages from the GGSN to a virtual private network, wherein the wireless client is allowed access to the virtual private network through the GGSN.

23. A Wireless Access Internet Network architecture for providing users direct and roaming access to a communications network, the architecture comprising:
a wireless client wherein the wireless client provides an authentication and includes:
a client wireless protocol module;
a client radio link adaptation layer configured to be in communication with the client wireless protocol module; and
a client radio subsystem configured to be in communication with the client radio link adaptation layer, wherein the wireless client is configured to be in communication with a plurality of wireless servers over a radio interface,
wherein at least two of the plurality of wireless servers are in communication with each other and allow respective wireless clients within one network of the at least two of the plurality of wireless servers to roam within the other network of the at least two of the plurality of wireless servers and wherein each of the wireless servers include:
a charging module;
a Home Location Register (HLR) signaling module;
a Domain Naming System (DNS)/Dynamic Host Configuration Protocol (DHCP) Remote Authentication Dial-in User Service (RADIUS) module; and
a data network in communication with the plurality of wireless servers;
a server wireless protocol module;
a server radio link adaption layer configured to communicate with the server wireless protocol module; and
a server radio subsystem configured to communicate with the client radio subsystem through a radio access point over the radio interface.

* * * * *